United States Patent
Imai et al.

(10) Patent No.: US 6,738,380 B1
(45) Date of Patent: *May 18, 2004

(54) APPARATUS, METHOD AND TRANSMITTING MEDIUM FOR TRANSMITTING AND RECEIVING FRAGMENTED CODED DATA

(75) Inventors: Kenichi Imai, Tokyo (JP); Minoru Tsuji, Chiba (JP); Takashi Koike, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,820

(22) Filed: Apr. 26, 1999

(30) Foreign Application Priority Data

May 8, 1998 (JP) .......................................... P10-125632

(51) Int. Cl.$^7$ ............................................... H04L 12/28
(52) U.S. Cl. ......................... 370/395.42; 370/395.21; 370/465
(58) Field of Search ................................ 370/352, 353, 370/395.1–395.43, 464, 476, 479, 503, 508, 509, 536–538, 540; 709/200, 203, 207, 220, 223, 226, 230–332, 236; 725/86, 87, 91, 93, 109

(56) References Cited

U.S. PATENT DOCUMENTS

| | | | | |
|---|---|---|---|---|
| 3,711,650 A | * | 1/1973 | Kuhn et al. ................. | 370/433 |
| 5,231,492 A | * | 7/1993 | Dangi et al. ................ | 348/14.1 |
| 5,451,942 A | * | 9/1995 | Beard et al. ................. | 341/50 |
| 5,521,922 A | * | 5/1996 | Fujinami et al. ........... | 348/423.1 |
| 5,533,021 A | * | 7/1996 | Branstad et al. ........... | 348/464 |
| 5,541,919 A | * | 7/1996 | Yong et al. ................. | 370/416 |
| 5,557,318 A | * | 9/1996 | Gabri el ...................... | 725/91 |
| 5,564,084 A | * | 10/1996 | Hirasawa .................... | 455/115 |
| 5,574,752 A | * | 11/1996 | Juri .............................. | 348/464 |
| 5,574,934 A | * | 11/1996 | Mirashrafi et al. ......... | 370/462 |
| 5,598,415 A | * | 1/1997 | Nuber et al. ................ | 370/474 |
| 5,625,626 A | * | 4/1997 | Umekita ...................... | 370/448 |
| 5,627,836 A | * | 5/1997 | Conoscenti et al. ........ | 370/397 |
| 5,726,989 A | * | 3/1998 | Dokic .......................... | 370/509 |
| 5,768,350 A | * | 6/1998 | Venkatakrishnan ......... | 370/418 |
| 5,874,997 A | * | 2/1999 | Haigh .......................... | 384/515 |
| 5,914,962 A | * | 6/1999 | Fimoff et al. ............... | 370/538 |
| 5,926,205 A | * | 7/1999 | Krause et al. .............. | 375/240.25 |
| 5,936,968 A | * | 8/1999 | Lyons .......................... | 331/2 |
| 5,974,380 A | * | 10/1999 | Smyth et al. ............... | 704/201 |
| 6,052,148 A | * | 4/2000 | Morishita .................... | 375/240.01 |
| 6,104,706 A | * | 8/2000 | Richter et al. .............. | 345/753 |
| 6,181,711 B1 | * | 1/2001 | Zhang et al. ................ | 370/468 |
| 6,381,254 B1 | * | 4/2002 | Mori et al. .................. | 370/537 |

* cited by examiner

Primary Examiner—Hassan Kizou
Assistant Examiner—David Odland
(74) Attorney, Agent, or Firm—Sonnenschein, Nath & Rosenthal LLP

(57) ABSTRACT

The invention intends to transmit audio signals of multiple channels in such a manner as to be able to decode and reproduce them in real time on the receiving side. Digital signals of multiple channels are each divided into one or more fragments in an audio signal input circuit, and the fragments of multiple channels are each encoded into coded fragment data by an encoder of the corresponding channel. At the time when transmission of one of the coded fragment data is ended, a multiplexer selects another of the coded fragment data of multiple channels to be next transmitted, and supplies it to a transmitting circuit.

51 Claims, 23 Drawing Sheets

APPARATUS, METHOD AND TRANSMITTING MEDIUM FOR TRANSMITTING AND RECEIVING FRAGMENTED CODED DATA

BACKGROUND OF THE INVENTION

1. Field of the Invention

The present invention relates to a transmitting apparatus and method, a receiving apparatus and method, and a providing medium. More particularly, the present invention relates to a transmitting apparatus and method, a receiving apparatus and method, and a providing medium which are suitably used, for example, in the case of encoding and transmitting digital signals such as digital audio signals of multiple channels, and receiving and decoding the digital signals to reproduce them in real time on the receiving side.

2. Description of the Related Art

For example, when digital signals such as digital audio signals are transmitted from the transmitting side to the receiving side via a network, e.g., Internet, it is customary that the audio signals are highly efficiently encoded into about 1/10 to 1/100 of original data on the transmitting side, and resulting coded data is transmitted to the receiving side where the coded data is decoded to reproduce the original data.

Generally, audio signals provided via a network are monaural or stereo, and are in a state where sounds of a plurality of musical instruments and a singing voice (words) are mixed with one another. On the receiving side, therefore, a volume level of the entire sounds can be adjusted to increase or decrease, but it is difficult to adjust a volume level of the sound of certain one musical instrument or the singing voice.

However, there is a demand for providing service with high user interactivity (i.e, providing highly versatile audio signals) that enables users on the receiving side to adjust a volume level of the sound of certain one musical instrument or the singing voice, listen to only a vocal apart or an accompaniment part, or listen to the sounds of several desired musical instruments in a mixed state.

To satisfy such a demand, audio signals representing the sounds of a plurality of musical instruments, an audio signal representing the singing voice, etc. require to be transmitted separately without being mixed together. When transmitting a plurality of audio signals separately, the amount of data transmitted to the receiving side is increased in comparison with the case of transmitting those audio signals in a mixed state. For suppressing such an increase in data amount, the amount of data for each of the plurality of audio signals must be reduced. This necessarily results in deterioration of sound quality of the audio signals reproduced on the receiving side.

On the other hand, a transmission rate (usable band) of a network varies depending on the line that is employed by a user for connection to the network, the number of users accessing the transmitting side such as a server, etc. In the case of receiving coded data of a plurality of audio signals, decoding the coded data and reproducing the audio signals in real time on the receiving side, therefore, it may become difficult to decode and reproduce the audio signals in real time because transmission of the coded data is relatively delayed due to the limited transmission rate of the network.

SUMMARY OF THE INVENTION

The present invention has been made in view of the state of art set forth above, and intends to transmit a plurality of highly versatile audio signals in an adaptable manner from the transmitting side so that the audio signals are decoded and reproduced in real time on the receiving side.

According to a first aspect of the present invention, in a transmitting apparatus for transmitting coded data resulted from encoding digital signals of multiple channels for each channel, the apparatus comprises dividing means for dividing each of the digital signals of multiple channels into one or more fragments, coding means for encoding respectively the fragments of multiple channels into coded fragment data, selecting means for selecting one of the coded fragment data of multiple channels at the predetermined time, and transmitting means for transmitting the coded fragment data selected by the selecting means.

According to a second aspect of the present invention, in a transmitting method for transmitting coded data resulted from encoding digital signals of multiple channels for each channel, the method comprises a dividing step of dividing each of the digital signals of multiple channels into one or more fragments, a coding step of encoding respectively the fragments of multiple channels into coded fragment data, a selecting step of selecting one of the coded fragment data of multiple channels at the predetermined time, and a transmitting step of transmitting the coded fragment data selected by the selecting step.

According to a third aspect of the present invention, in a providing medium for providing a computer program for rendering a computer to execute a process of transmitting coded data resulted from encoding digital signals of multiple channels for each channel, the computer program includes a dividing step of dividing each of the digital signals of multiple channels into one or more fragments, a coding step of encoding each of the fragments of multiple channels into coded fragment data, a selecting step of selecting one of the coded fragment data of multiple channels at the predetermined time, and a transmitting step of transmitting the coded fragment data selected by the selecting step.

According to a fourth aspect of the present invention, in a providing medium for providing coded data resulted from encoding digital signals of multiple channels for each channel, wherein the medium provides coded fragment data that is obtained by dividing each of the digital signals of multiple channels into one or more fragments, encoding respectively the fragments of multiple channels into coded fragment data, and selecting and outputting one of the coded fragment data of multiple channels at the predetermined time.

According to a fifth aspect of the present invention, in a receiving apparatus for receiving coded data resulted from encoding digital signals of multiple channels for each channel, the apparatus comprises receiving means for receiving the coded data, separating means for separating each of the coded data into coded fragment data that has been resulted from dividing each of the digital signals of multiple channels into one or more fragments and encoding each of the fragments into the coded fragment data, and time information related to the reproduction start time when reproduction of the coded fragment data is to be started, decoding means for decoding the coded fragment data into the fragment, and control means for controlling reproduction of the fragment outputted from the decoding means in accordance with the time information.

According to a sixth aspect of the present invention, in a receiving method for receiving coded data resulted from encoding digital signals of multiple channels for each channel, the method comprises a receiving step of receiving the coded data, a separating step of separating each of the coded data into coded fragment data that has been resulted from dividing the digital signals of multiple channels into one or more fragments and encoding each of the fragments into the coded fragment data, and time information related to the reproduction start time when reproduction of the coded fragment data is to be started, a decoding step of decoding the coded fragment data into the fragment, and a control step of controlling reproduction of the fragment obtained in the decoding step in accordance with the time information.

According to a seventh aspect of the present invention, in a providing medium for providing a computer program for rendering a computer to execute a process of receiving coded data resulted from encoding digital signals of multiple channels for each channel, the computer program included a receiving step of receiving the coded data, a separating step of separating each of the coded data into coded fragment data that has been resulted from dividing the digital signals of multiple channels into one or more fragments and encoding each of the fragments into the coded fragment data, and time information related to the reproduction start time when reproduction of the coded fragment data is to be started, a decoding step of decoding the coded fragment data into the fragment, and a control step of controlling reproduction of the fragment obtained from the decoding step in accordance with the time information.

According to an eighth aspect of the present invention, in a receiving apparatus for receiving coded data resulted from encoding digital signals of multiple channels for each channel, the apparatus comprises receiving means for receiving coded fragment data that is obtained by dividing each of the digital signals of multiple channels into one or more fragments, encoding respectively the fragments of multiple channels into coded fragment data, and selecting and transmitting one of the coded fragment data of multiple channels at the predetermined time; and decoding means for decoding the coded fragment data received by the receiving means into the fragment.

According to a ninth aspect of the present invention, in a receiving method for receiving coded data resulted from encoding digital signals of multiple channels for each channel, the method comprises a receiving step of receiving coded fragment data that is obtained by dividing each of the digital signals of multiple channels into one or more fragments, encoding respectively the fragments of multiple channels into coded fragment data, and selecting and transmitting one of the coded fragment data of multiple channels at the predetermined time; and a decoding step of decoding the coded fragment data received by the receiving means into the fragment.

According to a tenth first aspect of the present invention, in a providing medium for providing a computer program for rendering a computer to execute a process of receiving coded data resulted from encoding digital signals of multiple channels for each channel, the computer program includes a receiving step of receiving coded fragment data that is obtained by dividing each of the digital signals of multiple channels into one or more fragments, encoding respectively the fragments of multiple channels into coded fragment data, and selecting and transmitting one of the coded fragment data of multiple channels at the predetermined time; and a decoding step of decoding the coded fragment data received by the receiving means into the fragment.

DESCRIPTION OF THE PREFERRED EMBODIMENTS

Embodiments of the present invention will be described below.

Figure 1:
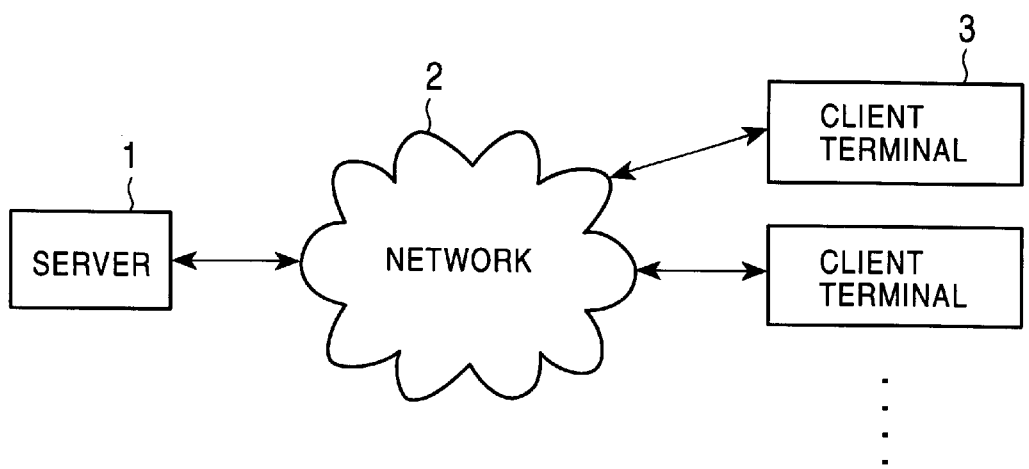
FIG. 1 is a diagram showing an exemplified construction of one embodiment of a transmission system to which the present invention is applied.

FIG. 1 shows an exemplified construction of one embodiment of a transmission system (the term "system" means a plurality of devices assembled together in a logical correlation regardless of whether the devices having their own constructions are all positioned in the same housing or not) to which the present invention is applied.

In the transmission system, when a request for audio signals of a song, for example, is issued from a client terminal 3 to a server 1 via a network 2 such as Internet, ISDN (Integrated Service Digital Network) or PSTN (Public Switched Telephone Network), the server 1 encodes the audio signals corresponding to the requested song with a predetermined coding method, and resulting coded data is transmitted to the client terminal 3 via the network 2. After receiving the coded data from the server 1, the client terminal 3 decodes the coded data and reproduces the original audio signals in real time, for example, (so-called streaming reproduction).

Figure 2:
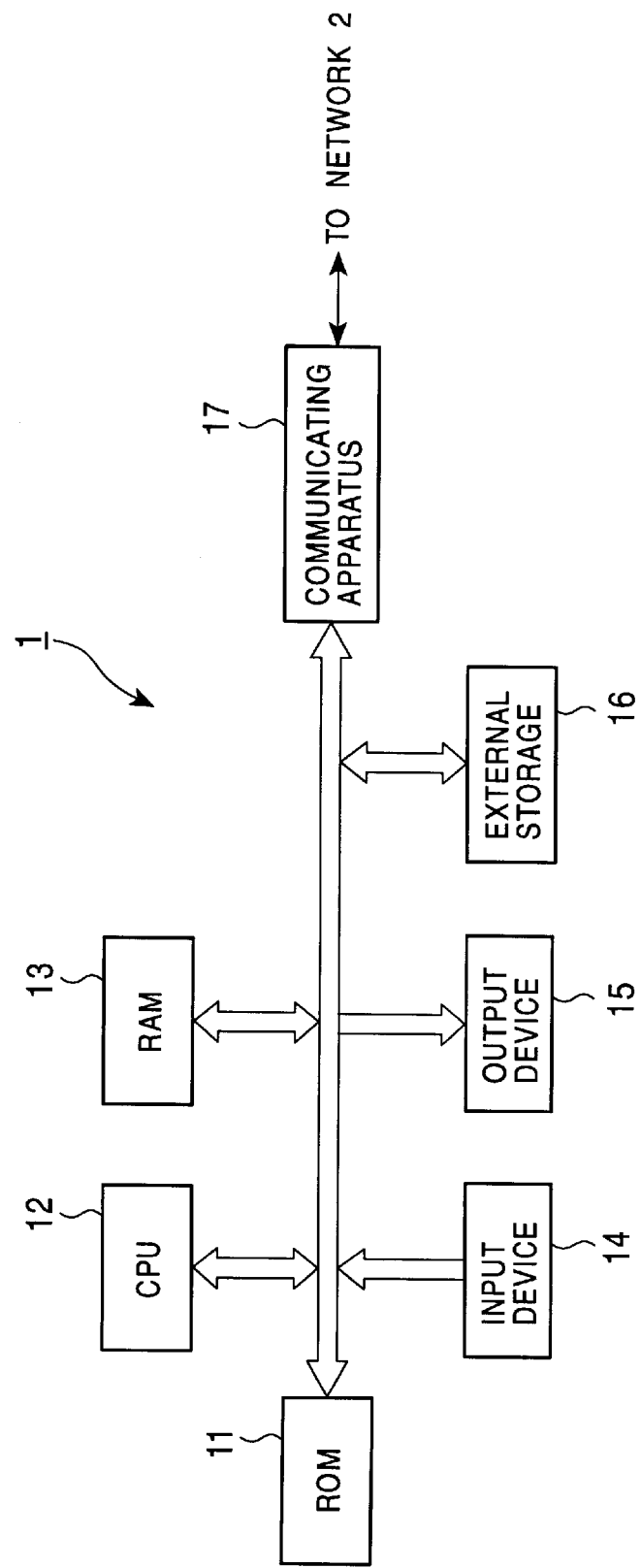
FIG. 2 is a block diagram showing an exemplified construction of hardware of a server 1 in FIG. 1.

FIG. 2 shows an exemplified construction of hardware of the server 1 in FIG. 1.

A ROM (Read Only Memory) 11 stores, for example, an IPL (Initial,Program Loading) program and so on. A CPU (Central Processing Unit) 12 executes an OS (Operating System), which is stored (recorded) in an external storage 16, in accordance with the IPL program stored in the ROM 11, and also executes various application programs, which are stored in the external storage 16, under control of the OS, thereby carrying out a coding process of audio signals, a transmitting process of coded data resulted from the coding process to the client terminal 3, etc. A RAM (Random Access Memory) 13 stores programs, data and so on which are necessary for operation of the CPU 12. An input device 14 is constructed of, e.g., a keyboard, a mouse, a microphone or an external interface, and is operated when necessary data or command is inputted. The input device 14 is also constructed to function as an interface for accepting input of digital audio signals externally applied to the client terminal 3. An output device 15 is constructed of, e.g., a display, a speaker or a printer, and displays or outputs necessary information. The external storage 16 comprises a hard disk, for example, and stores the OS and the application programs mentioned above. The external storage 16 also stores other data including data necessary for operation of the CPU 22, etc. A communicating apparatus 17 carries out control required for communication via the network 2.

Figure 3:
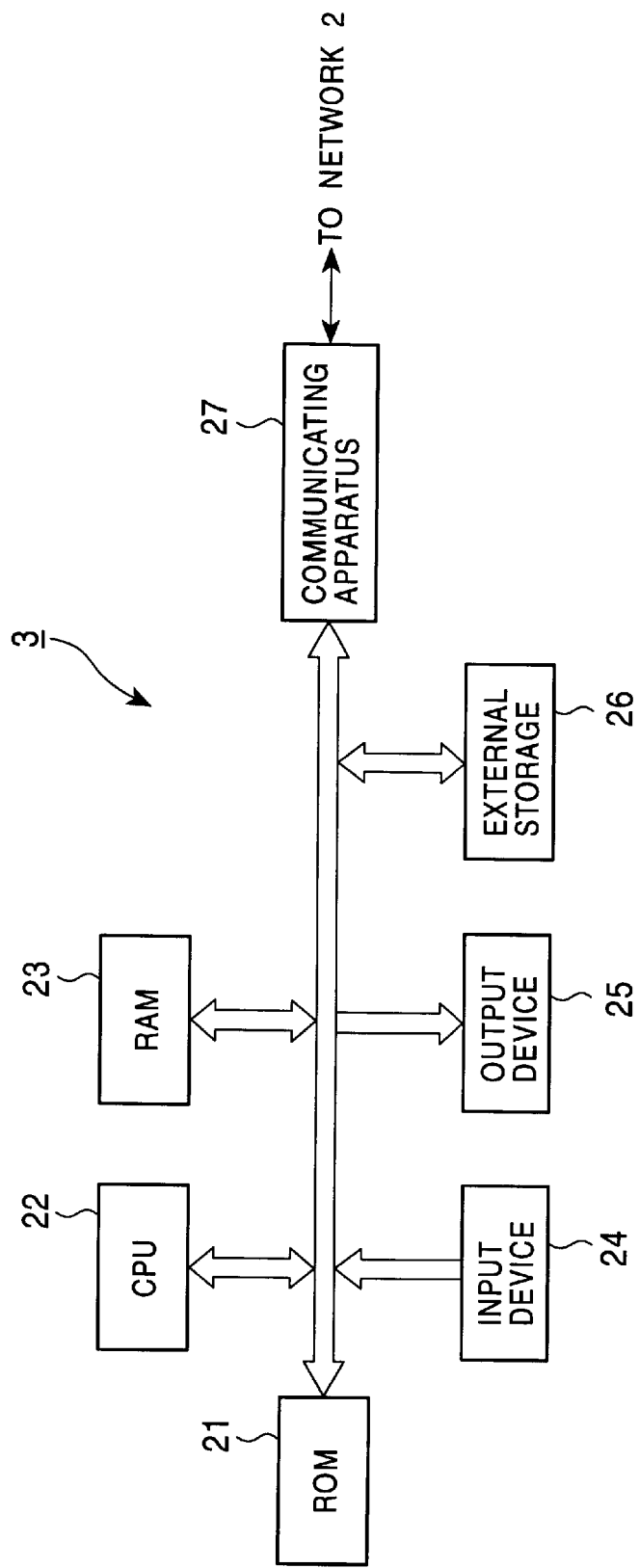
FIG. 3 is a block diagram showing an exemplified construction of hardware of a client terminal 3 in FIG. 1.

FIG. 3 shows an exemplified construction of hardware of the client terminal 3 in FIG. 1.

The client terminal 3 is made up of illustrated components 21–27, i.e, a ROM 21 to a communicating apparatus 27, and has a construction basically similarly to that of the server 1 made up of the ROM 11 to the communicating apparatus 17.

Unlike the server 1, an external storage 26 stores, as application programs, a program for decoding the coded data transmitted from the server 1, programs for executing later-described processing, and so on. A CPU 22 executes those application programs to, for example, decode the coded data and perform a reproducing process.

Figure 4:
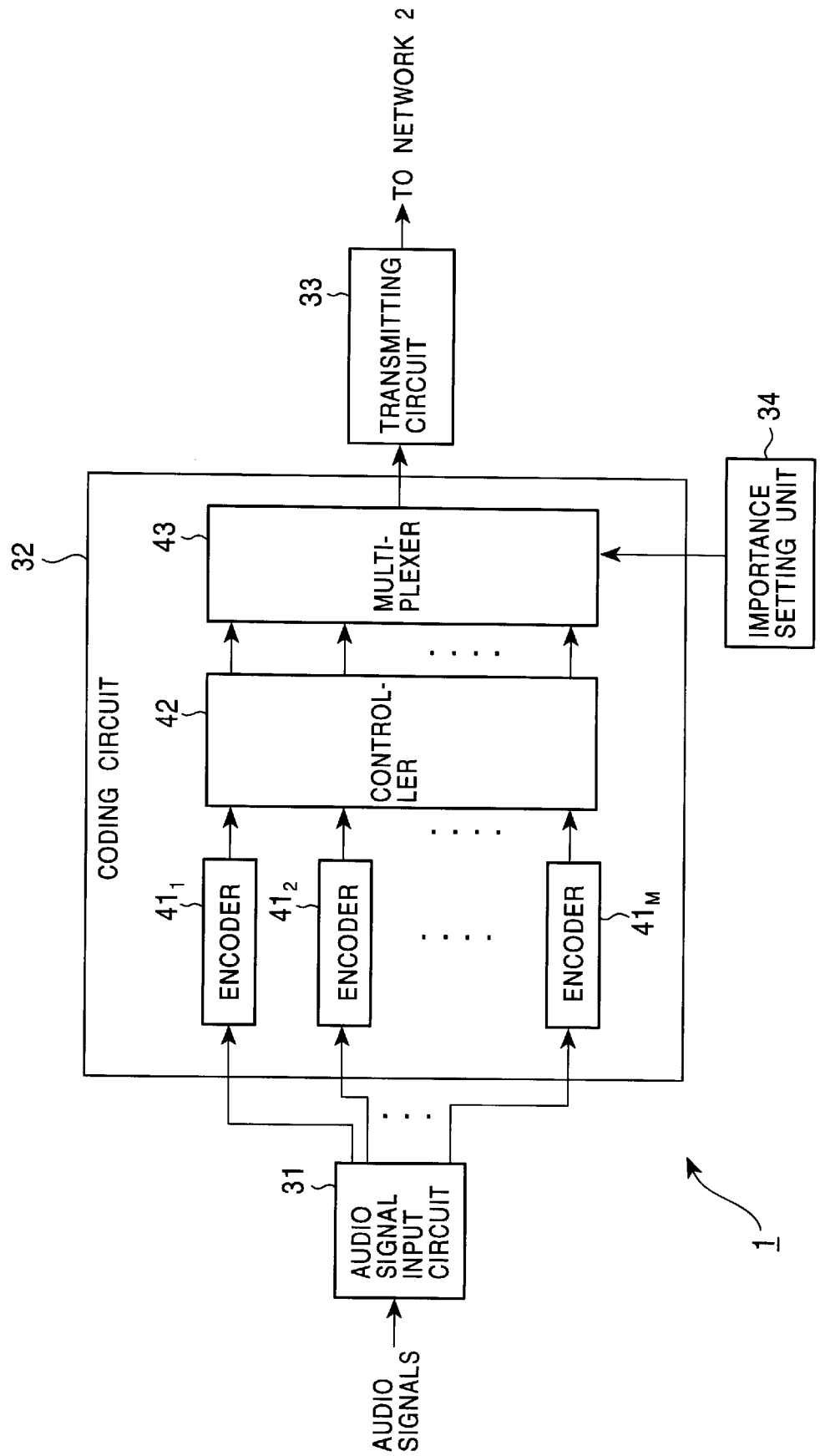
FIG. 4 is a block diagram showing an exemplified functional construction of the server 1 in FIG. 2.

FIG. 4 shows an exemplified functional construction of the server 1 in FIG. 2. The illustrated construction is realized upon the CPU 12 executing the application programs stored in the external storage 16.

Audio signals to be provided to the client terminal 3 are supplied to an audio signal input circuit 31. In the audio signal input circuit 31, analog audio signals are A/D-converted into digital audio signals. Then, the audio signal input circuit 31 separates the digital audio signals for each of channels, for example, and divides the audio signal of each channel into fragments each having a predetermined length.

More specifically, audio signals of a piece of music, for example, are separated for each of respective parts of guitar, piano, drum, song (words), etc. that constitute the piece of music together, and are inputted to the audio signal input circuit 31 in a synchronous relation. The audio signal input circuit 31 allocates a predetermined channel to the audio signal of each part. Further, the audio signal input circuit 31 divides the audio signal of each of the multiple channels into fragments each having a predetermined length, and then supplies the fragments to a coding circuit 32.

Note that audio signals of two or more parts may be inputted to the audio signal input circuit 31 in a mixed condition. In this case, the audio signal input circuit 31 outputs fragments of the audio signals in the mixed condition.

Also, audio signals inputted to the audio signal input circuit 31 may be in the form of, e.g., MIDI (Musical Instrument Digital Interface) data rather than waveforms of the actual audio signals themselves.

The audio signal input circuit 31 can be constructed to divide each of digital signals of multiple channels into fragments each having a fixed length or a variable length. When dividing an audio signal into fragments each having a variable length, the fragments can be produced by detecting, for example, a soundless portion of the audio signal or a portion thereof where power (square sum of amplitude) is not larger than a predetermined value), and splitting the audio signal at every such a portion.

Alternatively, the audio signal may be divided into fragments having the same lengths for all the multiple channels (i.e, if fragments of the audio signal of one channel have lengths of L1, L2, etc. starting from the head, fragments of the audio signal of any other channel may also have lengths of L1, L2, etc. starting from the head).

Further, the audio signal may be divided into fragments having independently different lengths for each of the channels. In other words, fragments of the audio signal of each channel may have different lengths depending on the channel.

The coding circuit 32 encodes the audio signals from the audio signal input circuit 31 at high efficiency.

More specifically, in the embodiment shown in FIG. 4, the coding circuit 32 comprises a number M of encoders $41_1$ to $41_M$, a controller 42, and a multiplexer 43.

The encoder $41_m$ (m=1, 2, . . . , M) is supplied with fragments of the audio signal of each corresponding channel (part) from the audio signal input circuit 31. The encoder $41_m$ encodes the fragments of the audio signal from the audio signal input circuit 31 with a predetermined coding method, and supplies resulting data (referred to as coded fragment data hereinafter) to the controller 42.

Here, examples of the coding method for the audio signal include linear PCM (Pulse Code Modulation), ADPCM (Adaptive Differential PCM), layers 1, 2, 3 of MPEG (Moving Picture Experts Group), ATRAC (Adaptive Transform Acoustic Coding), and ATRAC 2. Incidentally, the coding methods employed in the encoders $41_1$ to $41_M$ may be the same or different from one another.

The controller 42 starts reproducing the fragments by decoding the decoded fragment data supplied from the encoders $41_1$ to $41_M$. For example, the controller 42 adds the time with the head of a piece of music set to a reference (referred to as the reproduction start time hereinafter) to the corresponding coded fragment data. Furthermore, the controller 42 adds necessary control information to the coded fragment data, followed by supplying the coded fragment data to the multiplexer 43.

The multiplexer 43 selects one of the coded fragment data of respective channels, supplied from the controller 42, at the predetermined timing (time) based on importance indexes representing levels of importance of the respective channels set in an importance setting unit 34, the reproduction start time added to each coded fragment data, the data amount of each coded fragment data, etc. Stated otherwise, at the time (counted from a reference set to, e.g., the time to start transmission of the head of music) when transmission of the previously selected coded fragment data is ended (referred to as the transmission end time hereinafter), the multiplexer 43 selects one of the coded fragment data of respective channels supplied from the controller 42, and outputs the selected coded fragment data (referred to as the selected fragment data hereinafter) to a transmitting circuit 33.

The transmitting circuit 33 converts the selected fragment data supplied from the multiplexer 43 into a format corresponding to the communication protocol adapted for the network 2, and transmits resulting coded data to the client terminal 3 via the network 2.

The importance indexes representing levels of importance of the respective channels for the audio signals coded by the encoders $41_1$ to $41_M$ are set in the importance setting unit 34. This setting is performed by, e.g., a person managing the server 1 who manipulates the importance setting unit 34. Specifically, in the case of a piece of music comprising parts of guitar, piano, drum and song (words), for example, if it is thought that the parts of song, piano, guitar and drum have levels of importance descending in the order named, the importance setting unit, 34 is operated so as to set importance indexes to the channels corresponding to the parts of song, piano, guitar and drum in match with this order. Rather than relying on the operation of the importance setting unit 34, the levels of importance of the respective channels may be set based on the magnitudes of power of the audio signals of respective channels or the number of soundless portions thereof. When the levels of importance of the respective channels are set with the operation of the importance setting unit 34, they will not change until the next operation. On the other hand, when the levels of importance of the respective channels are set based on the magnitudes of power of the audio signals or the number of soundless portions thereof, they may change during transmission.

Figure 5:
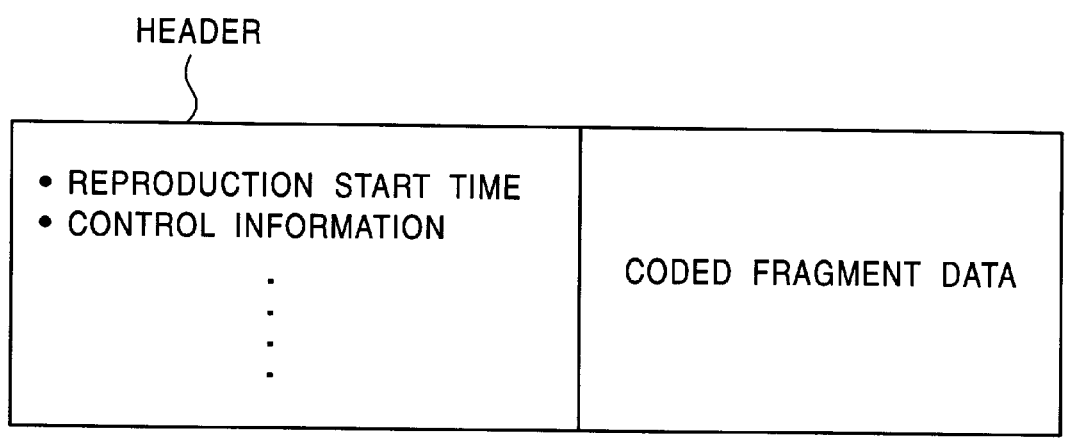
FIG. 5 is a diagram showing a format of data outputted from a controller 42 in FIG. 4.

FIG. 5 shows a format of data outputted from the controller 42 in FIG. 4.

As shown in FIG. 5, the controller 42 adds the relevant reproduction start time, control information, etc, as a header, to the coded fragment data outputted from the encoder $41_m$, followed by outputting resulting coded data.

Figure 6:
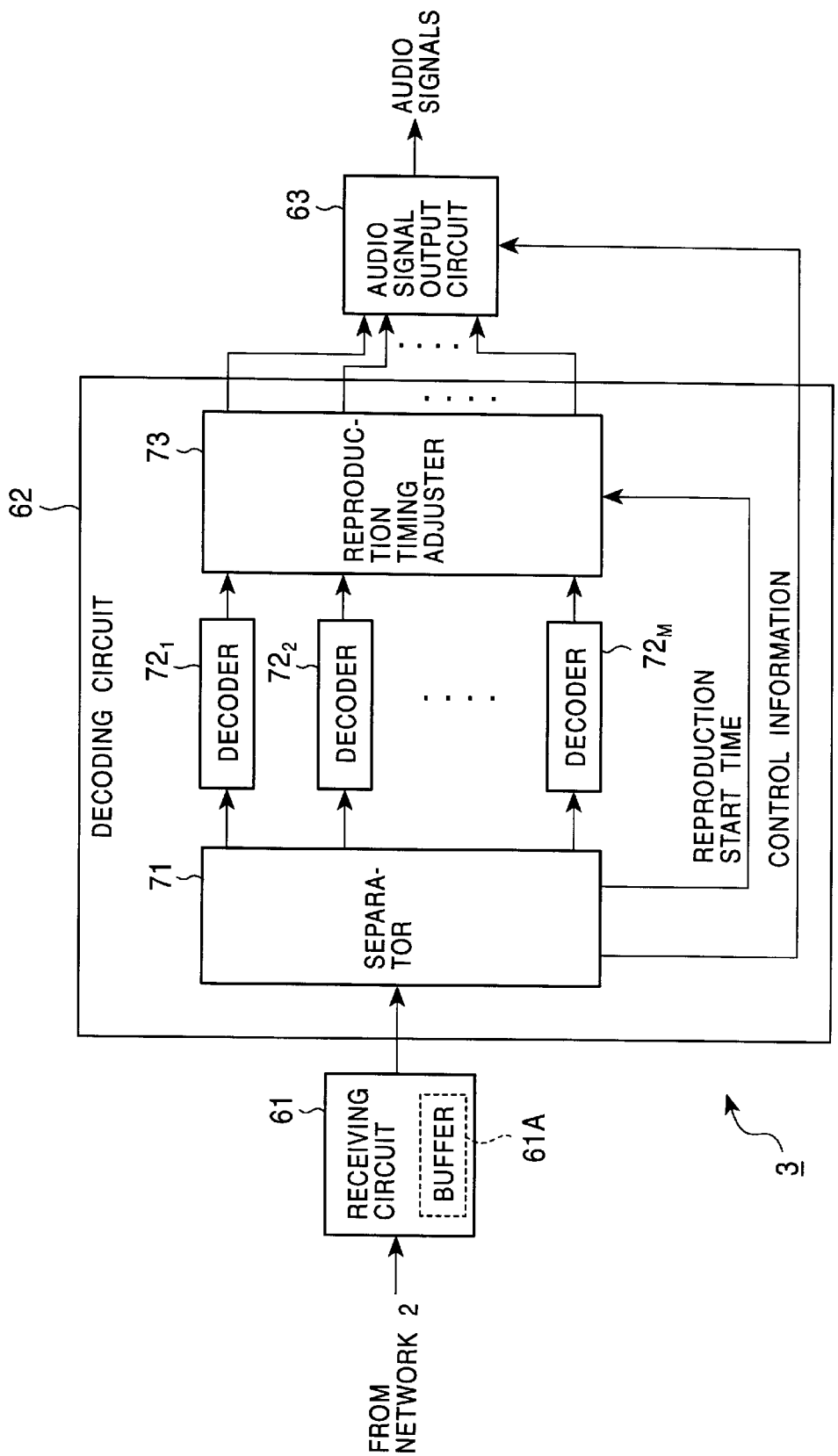
FIG. 6 is a block diagram showing an exemplified functional construction of the client terminal 3 in FIG. 3.

FIG. 6 shows an exemplified functional construction of the client terminal 3 in FIG. 3. The illustrated construction is realized upon the CPU 22 executing the application programs stored in the external storage 26.

The coded data transmitted from the server 1 via the network 2 is supplied to a receiving circuit 61. After receiving the coded data, the receiving circuit 61 performs format conversion on the received coded data corresponding to the format conversion made in the transmitting circuit 33 in FIG. 4, and then supplies resulting coded data to a decoding circuit 62. The decoding circuit 62 decodes the coded data supplied from the receiving circuit 61.

More specifically, the decoding circuit 62 comprises a separator 71, a number M of decoders $72_1$ to $72_M$, and a reproduction timing adjuster 73. While the number of decoders $72_1$ to $72_M$ constituting the decoding circuit 62 is set here to be the same as the number of encoders $41_1$ to $41_M$ constituting the coding circuit 32 in FIG. 4, it is not always needed that both the numbers are identical to each other. If the number of decoders is less than the number of encoders, the audio signals of some one ore more channels (parts) are neither decoded nor reproduced in the client terminal 3. Further, the decoders $72_1$ to $72_M$ are here constructed to be, for example, capable of decoding the data coded respectively in the encoders $41_1$ to $41_M$ in FIG. 4.

The coded data outputted from the receiving circuit 61 is supplied to the separator 71. The separator 71 separates the coded data into the coded fragment data and the header, followed by supplying the coded fragment data to corresponding channels of the decoders $72_1$ to $72_M$, respectively. In addition, the separator 71 supplies the reproduction start time placed in the header to the reproduction timing adjuster 73, and also supplies the control information placed in the header to an audio signal output circuit 63.

The decoder $72_m$ decodes the coded fragment data from the separator 71 into the original fragments which are supplied to the reproduction timing adjuster 73. The reproduction timing adjuster 73 supplies the original fragments of the audio signal to the audio signal output circuit 63 while adjusting the output timing to the audio signal output circuit 63 so that the fragments of the audio signal supplied from the decoder $72_m$ are outputted (reproduced) from the audio signal output circuit 63 at the reproduction start time applied from the separator 71.

The audio signal output circuit 63 performs D/A conversion of the fragments of the audio signal of each channel supplied from the reproduction timing adjuster 73, and outputs resulting audio signals after mixing if required. The audio signals outputted from the audio signal output circuit 63 are then outputted from, e.g., a speaker constituting the output device 25 (FIG. 3).

Figure 7A:
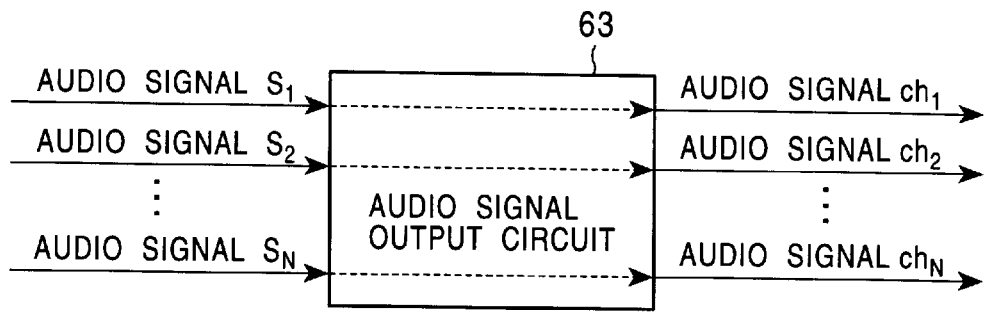
FIGS. 7A to 7C are diagrams for explaining processing executed by an audio signal output circuit 63 in FIG. 6.
Figure 7B:
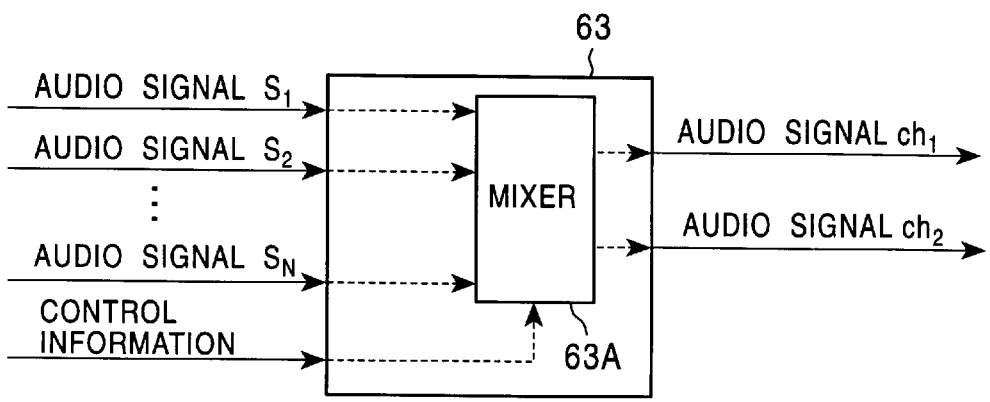
Figure 7C:
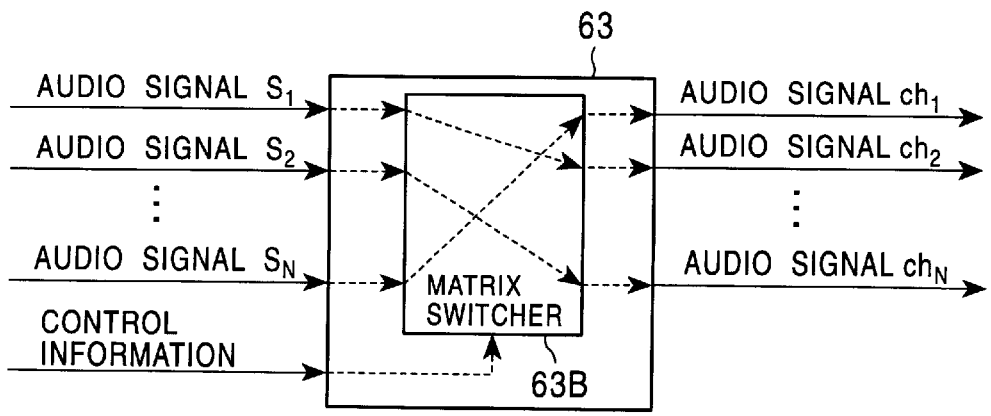

FIGS. 7A to 7C show exemplified constructions of the audio signal output circuit 63 in FIG. 6.

In an embodiment of FIG. 7A, the audio signal output circuit 63 is constructed such that a number N (<M) of audio signals (fragments) $S_1$ to $S_N$ outputted from the reproduction timing adjuster 73 are outputted as audio signals $ch_1$ to $ch_N$, respectively, as they are.

In an embodiment of FIG. 7B, the audio signal output circuit 63 has a mixer 63A. The mixer 63A mixes the number N of audio signals $S_1$ to $S_N$ outputted from the reproduction timing adjuster 73 in accordance with the control information from the separator 71, and outputs resulting audio signals $ch_1$ and $ch_2$. The audio signals $ch_1$ and $ch_2$ correspond to, for example, an L (left) channel and an R (right) channel, respectively. In this case, the control information includes information indicating from which one of the L and R channels each of the audio signals $S_1$ to $S_N$ is to be outputted. Further, in this case, the control information may include information for panning each of the audio signals $S_1$ to $S_N$. Specifically, the control information may include information indicating at what percentage the audio signal $S_n$ (n=1, 2, ..., N) is to be outputted from each of the L and R channels (i.e., indicating, for example, that the audio signal $S_n$ (n=1, 2, ..., N) is outputted at levels of 30% and 70% from the L and R channels, respectively.

In an embodiment of FIG. 7C, the audio signal output circuit 63 has a matrix switcher 63B. The matrix switcher 63B is constructed so as to output each of the number N of audio signals $S_1$ to $S_N$ outputted from the reproduction timing adjuster 73 as any of audio signals $ch_1$ to $ch_N$ in accordance with the control information from the separator 71. In this case, the control information includes information indicating that each of the audio signals $S_1$ to $S_N$ is to be outputted as which one of the audio signals $ch_1$ to $ch_N$.

Rather than supplying the control information as being included in the coded data, the audio signal output circuit 63 may be given with the control information that is entered upon the user operating the input device 24 (FIG. 3). In this case, the user can freely set how the audio signals are outputted from the audio signal output circuit 63.

Next, a transmitting process of the audio signals (in the coded form) executed by the server 1 will be described with reference to a flowchart of FIG. 8.

Figure 8:
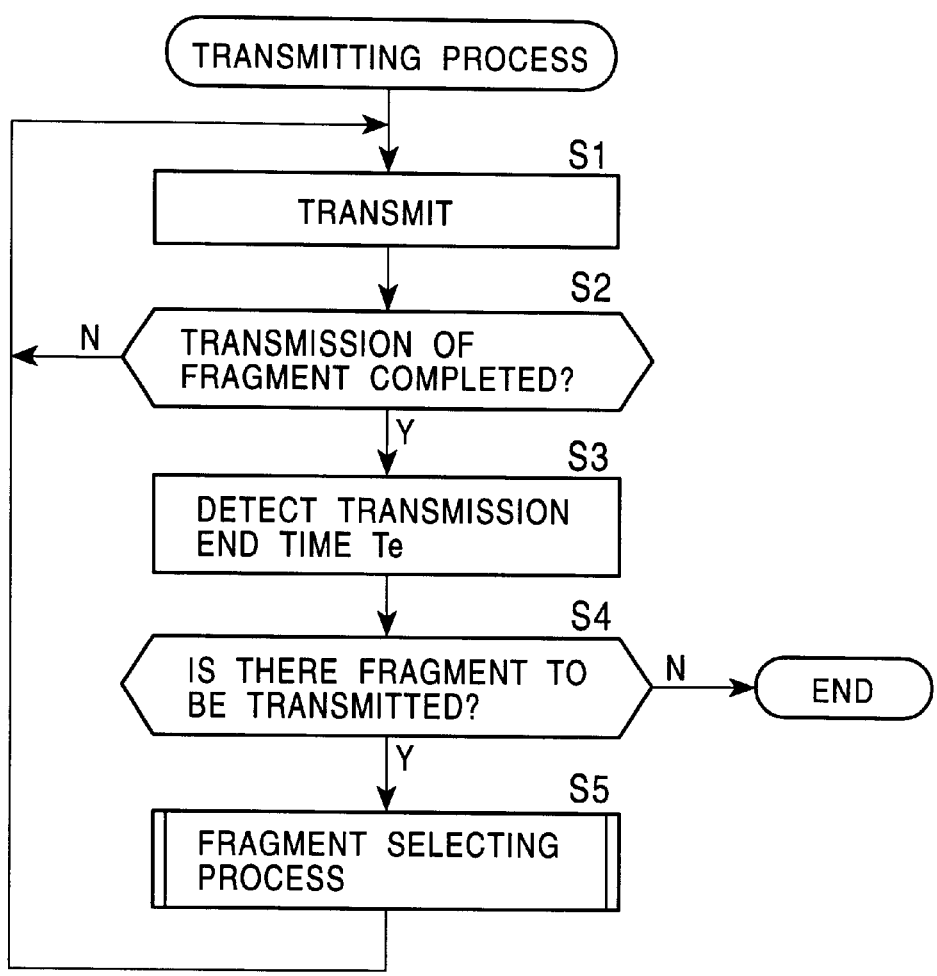
FIG. 8 is a flowchart for explaining a first embodiment of a transmitting process executed by the server 1.

Upon receiving a request for a piece of music from the client terminal 3 via the network 2, the server 1 executes the transmitting process in accordance with the flowchart of FIG. 8, whereby audio signals of respective parts of the piece of music requested from the client terminal 3 are transmitted, as audio signals of separate independent channels, to the client terminal 3 via the network 2 so that they can be decoded and reproduced in real time.

More specifically, in the case of transmitting the audio signals of respective parts as the audio signals of separate independent channels without mixing them, as mentioned above, the amount of data is increased as compared with the case of transmitting the audio signals after mixing them. Accordingly, if the transmission rate of the network 2 is insufficient with respect to the amount of data, transmission of the audio signals of multiple channels is delayed relative to the start of reproduction thereof and the audio signals can no longer be reproduced in real time.

On the other hand, if the data amount of the audio signals of multiple channels is reduced so that the transmission rate of the network 2 is not insufficient with respect to the data amount of the audio signals of multiple channels transmitted, the audio signals having deteriorated sound quality are supplied to the client terminal 3 even when the amount of traffic in the network 2 is small and a large (high) transmission rate can be secured.

In view of the above, the embodiment ensures real-time reproduction of audio signals in the client terminal 3 by adaptively selecting some of fragments of audio signals of multiple channels which is transmitted to the client terminal 3, i.e., by making selection such that the fragments of an audio signal of at least one channel having high importance are always transmitted while transmission of the fragments of audio signals of other channels is given up (or abandoned) as the occasion requires, when the transmission rate of the network 2 is insufficient (i.e., when real-time reproduction can no longer be realized if audio signals of all channels are transmitted).

More specifically, in the server 1 (FIG. 4), audio signals of respective parts making up a piece of music requested from the client terminal 3 are inputted to the audio signal input circuit 31. In the audio signal input circuit 31, the audio signals of respective parts inputted thereto are A/D-converted into digital audio signals of predetermined respective channels. Further, the audio signal input circuit 31 divides the audio signal of each channel into fragments each having a predetermined length and supplies the fragments to the coding circuit 32. In the coding circuit 32, the encoder $41_m$ encodes the fragments of the audio signal of the corresponding channel and supplies resulting coded fragment data to the controller 42.

The controller 42 adds the relevant reproduction start time and other necessary control information to the coded fragment data supplied from the encoders $41_1$ to $41_M$, and supplies resulting data to the multiplexer 43.

Upon receiving the coded fragment data (added with headers) from the controller 42 for the first time after a request for the piece of music has been issued from the client terminal 3, the multiplexer 43 chooses, as selected fragment data, one of the coded fragment data that belongs to the channel set to the highest importance in the importance setting unit 34 and has the earliest reproduction start time, followed by supplying the selected fragment data to the transmitting circuit 33. Correspondingly, in step S1 of FIG. 8, the transmitting circuit 33 transmits the selected fragment data from the multiplexer 43, i.e., the coded fragment data that, in this case, belongs to the channel set to the highest importance in the importance setting unit 34 and has the earliest reproduction start time, to the client terminal 3 via the network 2.

The control flow then goes to step S2 to determine whether transmission of the selected fragment data is fully completed. If the transmission of the selected fragment data is not completed, the control flow returns to step Si, causing the transmitting circuit 33 to continue transmitting the selected fragment data.

If it is determined in step S2 that the transmission of the selected fragment data is completed, the control flow goes to step S3 where the multiplexer 43 detects the transmission end time $T_e$ when the transmission of the selected fragment data is completed. The control flow then goes to step S4 to determine whether any coded fragment data to be transmitted still exists. If it is determined in step S4 that the coded fragment data to be transmitted still exists, the control flow goes to step S5 to execute a fragment selecting process in which the multiplexer 43 selects the coded fragment data to be next transmitted to the transmitting circuit 33. When the fragment selecting process is executed by the multiplexer 43 and the selected fragment data is given by selection of the coded fragment data, the control flow returns to step Si after supplying the selected fragment data to the transmitting circuit 33. In the transmitting circuit 33, the selected fragment data from the multiplexer 43 is transmitted to the client terminal 3 via the network 2. Thereafter, the control flow goes to step S2 to repeat the processing described above.

On the other hand, if it is determined in step S4 that there is no coded fragment data to be transmitted, the transmitting process is ended.

The fragment selecting process executed in step S5 of FIG. 8 will now be described in more detail.

Figure 9:
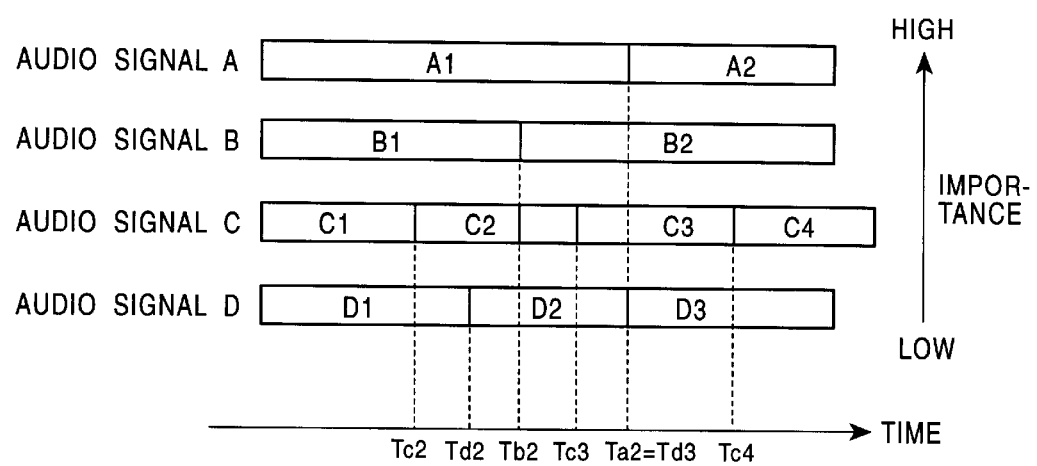
FIG. 9 is a chart for explaining a fragment selecting process executed in step S5 of FIG. 8.

It is here assumed that the piece of music requested from the client terminal 3 is made up of audio signals A, B, C, D of four channels, for example, and the importance setting unit 34 sets levels of importance descending in the order named, as shown in FIG. 9. In an example of FIG. 9, therefore, the channel of the audio signal A has the highest importance and the channel of the audio signal D has the lowest importance. The channel having the highest importance channel (here the channel of the audio signal A) will be referred to also as the most importance channel hereinafter.

In the example of FIG. 9, the audio signal A is divided into two fragments A1 and A2; the audio signal B is divided into two fragments B1 and B2; the audio signal C is divided into four fragments C1, C2, C3 and C4; and the audio signal D is divided into three fragments D1, D2 and D3. The fragments A1, B1, C1 and D1 have the same reproduction start time, and the fragments A2, B2, C2, C3, C4, D2 and D3 have respectively the reproduction start time $T_{a2}$, $Tb_{b2}$, $T_{c2}$, $T_{c3}$, $T_{c4}$, $T_{d2}$ and $t_{d3}$. The relation of $T_{c2}<T_{d2}<T_{b2}<T_{c3}<T_{a2}>t_{d3}<T_{c4}$ is set in the example of FIG. 9.

As a first embodiment of the fragment selecting process, the multiplexer 43 is constructed to preferentially choose, as the selected fragment data, (1) the coded fragment data having the earlier reproduction start time, and (2) the coded fragment data having higher importance if the reproduction start time is the same. In this case, the fragment selecting process in step S5 of FIG. 8 is executed in accordance with, for example, a flowchart shown in FIG. 10.

Figure 11:
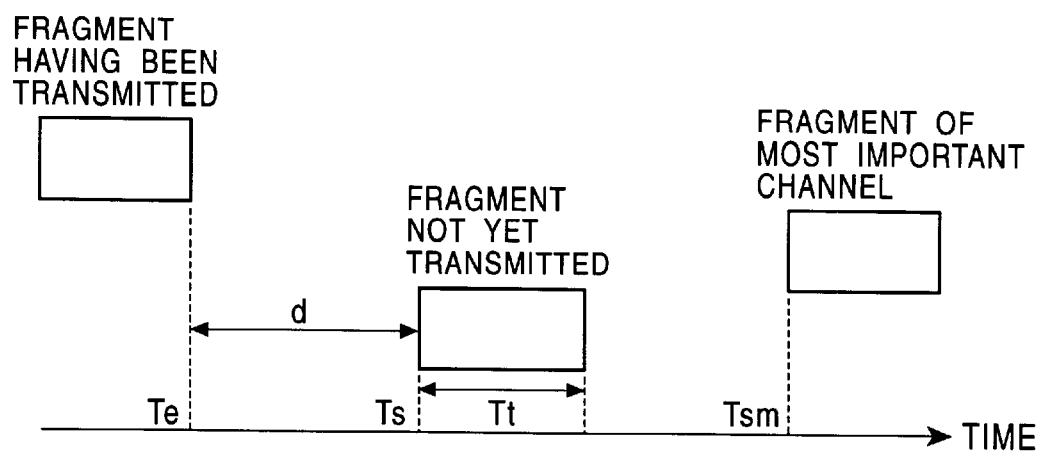
FIG. 11 is a chart for explaining processing executed in step S11 of FIG. 10.

In the fragment selecting process of this case, a candidate for the selected fragment data is first chosen in step S11 from among the coded fragment data not yet transmitted for each of the channels except the most important channel. Specifically, as shown in FIG. 11 by way of example, assuming that the transmission end time of the coded fragment data previously transmitted as the selected fragment data is $T_e$, the reproduction start time of the coded fragment data not yet transmitted for each of the channels except the most important channel is $T_s$, the period of time required for transmitting that coded fragment data is $T_t$, and the reproduction start time of the coded fragment data of the most important channel to be next transmitted (in FIG. 9, for example, if the fragment A1 has been already transmitted, the fragment A2 is the fragment of the most important channel to be next transmitted) is $T_{sm}$, the coded fragment data, for which the reproduction start time $T_s$ is after (later than) the transmission end time $T_e$ and the period of time d $(=T_s - T_e)$ from the reproduction start time $T_s$ to the transmission end time $T_e$ is minimum, is chosen as the selected fragment data candidate.

The control flow then goes to step S12 where, from among the selected fragment data candidates chosen from the respective channels except the most important channel, one for which the period of time d from the reproduction start time $T_s$ to the transmission end time $T_e$ is minimum is chosen as temporary selected fragment data.

Subsequently, the control flow goes to step S13 to determine whether two or more of the selected fragment data candidates have the same period of time d. If it is determined in step S13 that two or more of the selected fragment data candidates have the same period of time d, namely, if the coded fragment data are chosen as the temporary selected fragment data from two or more channels in step S12, the control flow goes to step S14 where one of the coded fragment data chosen from the two or more channels, which belongs to the channel having the highest importance, is finally chosen as the temporary selected fragment data, followed by going to step S15.

If it is determined in step S13 that no selected fragment data candidates have the same period of time d, namely, if the coded fragment data is chosen as the temporary selected fragment data from one channel in step S12, that coded fragment data is finally chosen as the temporary selected fragment data, following which the control flow goes to step S15 while skipping step S14. In step S15, the transmission end time of the temporary selected fragment data is estimated on an assumption that it is transmitted (the estimated time will be referred to as the estimated end time hereinafter), and whether the estimated end time is before the reproduction start time $T_s$ of the temporary selected fragment data is determined.

Here, the estimated end time of the temporary selected fragment data is derived, for example, by adding the period of time $T_t$ required for transmitting the temporary selected fragment data to the transmission end time $T_e$, i.e., $(T_t+T_e)$.

Also, the period of time $T_t$ required for transmitting the temporary selected fragment data is derived, for example, by dividing the data amount of the temporary selected fragment data by the transmission rate of the network 2, i.e., ([data amount]/[transmission rate]).

The transmission rate of the network 2 can be derived, for example, as follows.

Generally, transmission between the server 1 and the client terminal 3 is performed such that a request for data is issued from the client terminal 3, and in response to the request the server 1 transmits the data, or that the server 1 transmits data, and upon receiving the data, the client terminal 3 transmits an acknowledge signal ACK to the server 1.

By using, for example, the time t1 when the server 1 receives a request for data from the client terminal 3, the bit amount n1 of data transmitted from the server 1 in response to the request, the time t2 when the server 1 receives a next request for data from the client terminal 3, and the bit amount n2 of data transmitted from the client terminal 3 along with the next request, therefore, the transmission rate B (bps) of the network 2 can be derived from the following formula:

$$B=(n1+n2)/(t2-t1)$$

The transmission rate B of the network 2 may be derived only upon the fragment selecting process of step S15 is first executed after the start of communication, and the initially derived transmission rate B may be used until the end of the communication. It is however desired that the transmission rate B of the network 2 be derived whenever the fragment selecting process of step S15 is first executed, because the transmission rate B basically changes with time depending on the traffic condition.

Where the network 2 comprises Internet, for example, the protocol called RTP (Real-time Transport Protocol), which is specified in RFC (Request For Comments) 1889 (issued by IFTE (Internet Engineering Task Force)), is usable. In this case, since the transmission time is assigned to each packet for use in RTP, the transmission rate B can be derived based on the packet transmission time.

Also, where a protocol of reserving the transmission rate (band) to be used as with RSVP (Resource Reservation Protocol) specified in RFC 2205 (issued by IFTF), for example, the reserved transmission rate can be used as it is.

If it is determined in step S15 that the estimated end time, at which the transmission of the temporary selected fragment data is to be completed, is before (prior to in time base) the reproduction start time $T_s$ of the same, namely, if the transmission of the temporary selected fragment data is to be completed until the reproduction start time $T_s$, the control flow goes to step S16 to determine whether the estimated end time, at which the transmission of the temporary selected fragment data is to be completed, is before the reproduction start time $T_{sm}$ of the fragment of the most important channel to be next transmitted.

If it is determined in step S16 that the estimated end time of transmission of the temporary selected fragment data is before the reproduction start time $T_{sm}$ of the fragment of the most important channel to be next transmitted, namely, if the transmission of the temporary selected fragment data is to be completed until the reproduction start time $T_{sm}$ of the fragment of the most important channel to be next transmitted, the control flow goes to step S17 where the temporary selected fragment data is decided as the selected fragment data, followed by returning to the main control flow.

On the other hand, if it is determined in step S15 that the estimated end time of transmission of the temporary selected fragment data is not before the reproduction start time $T_s$ of the same, namely, if the transmission of the temporary selected fragment data is not to be completed until the reproduction start time $T_s$, the control flow goes to step S18 to determine whether any of the selected fragment data candidates, which are chosen in step S11, remains not yet finally chosen as the temporary selected fragment data. If it is determined in step S18 that any selected fragment data candidate remains not yet finally chosen as the temporary selected fragment data, the control flow returns to step S12, following which the above-described processing subsequent to step S12 is repeated on the candidate (for the selected fragment data) not yet chosen as the temporary selected fragment data.

Also, if it is determined in step S16 that the estimated end time of transmission of the temporary selected fragment data is not before the reproduction start time $T_{sm}$ of the fragment of the most important channel to be next transmitted, namely, if the transmission of the temporary selected fragment data is to be completed until the reproduction start time $T_{sm}$ of the fragment of the most important channel to be next transmitted, the control flow goes to step S18, following which the same processing as described above is carried out.

In this embodiment, since transmission of fragments of the most important channel is essential to ensure real-time reproduction of audio signals in the client terminal 3 as mentioned above, transmission of the selected fragment data must be completed before the reproduction start time of the fragment of the most important channel to be next transmitted. Accordingly, if the transmission of the temporary selected fragment data must be completed until the reproduction start time $T_{sm}$ of the fragment of the most important channel to be next transmitted, transmitting the temporary selected fragment data as the selected fragment data is abandoned, and it is checked whether any other candidate can become the selected fragment data.

Additionally, if transmission of the coded fragment data is started until the reproduction start time thereof, real-time reproduction of audio signals can be made theoretically. Taking an allowance into account, however, one condition for choosing the coded fragment data as the selected fragment data is set here to that the transmission of the coded fragment data is completed until the reproduction start time thereof.

On the other hand, if it is determined in step S18 that there remains no selected fragment data candidate which is not yet finally chosen as the temporary selected fragment data, the control flow returns to step S19 where the coded fragment data of the most important channel to be next transmitted is decided as the selected fragment data, followed by returning to the main control flow.

Figure 10:
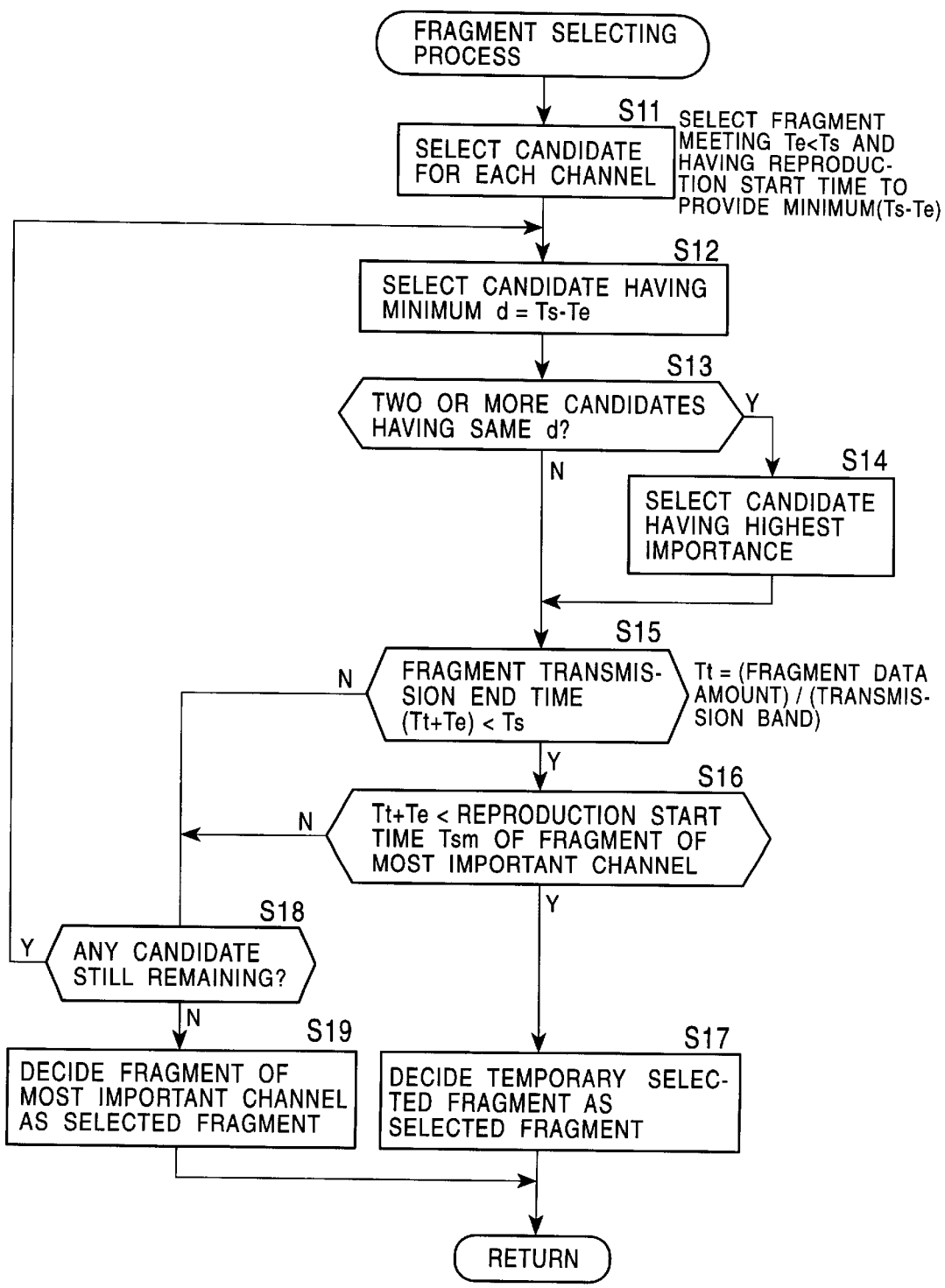
FIG. 10 is a flowchart for explaining a first embodiment of the fragment selecting process executed in step S5 of FIG. 8.

With the fragment selecting process of FIG. 10, the audio signals A to D of four channels shown in FIG. 9 are transmitted as shown in FIGS. 12B to 12G.

Figure 12:
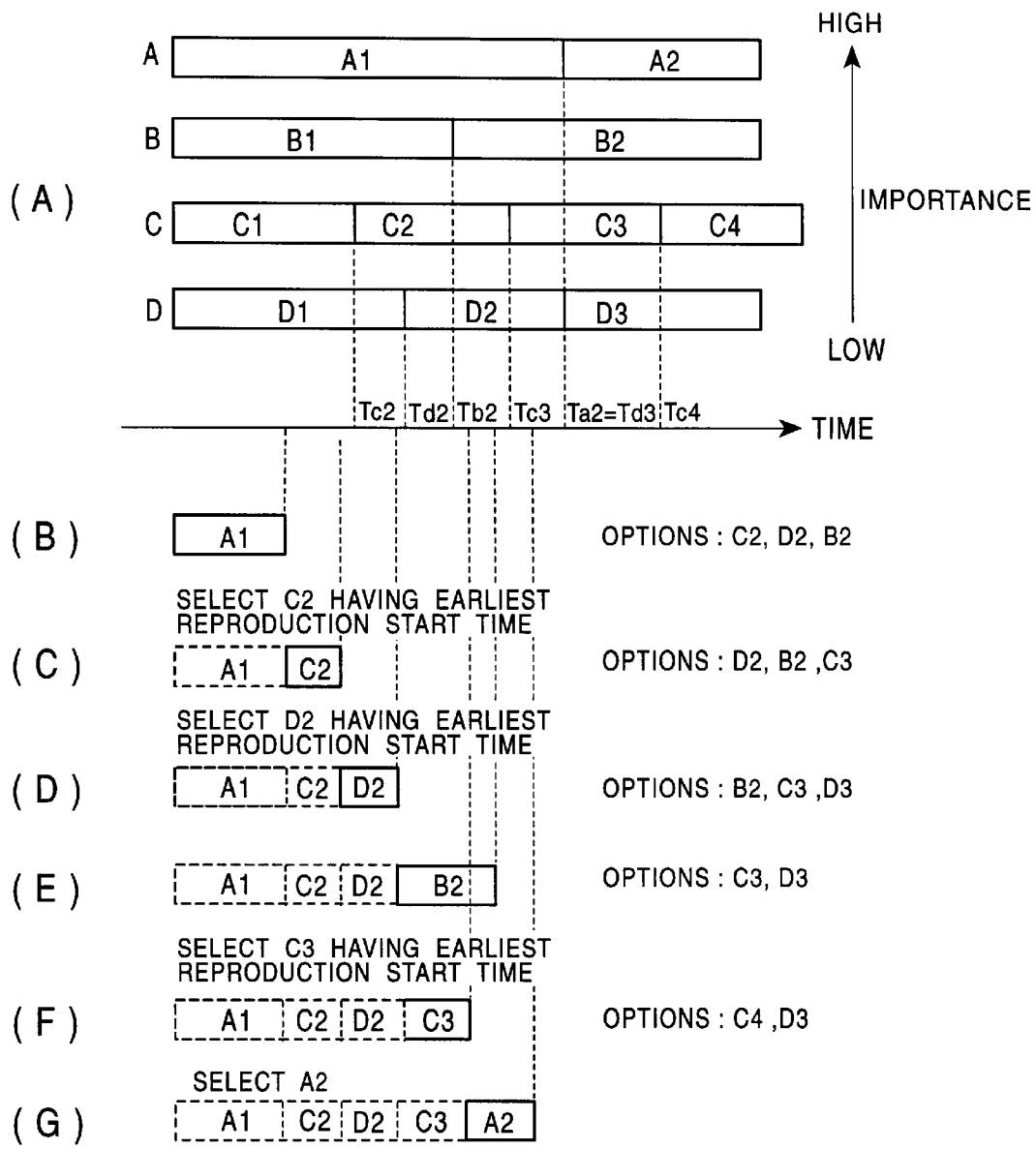
FIGS. 12A to 12G are charts for explaining the fragment selecting process in FIG. 10.

More specifically, as described above in connection with step S1 of FIG. 8, since the coded fragment data of the most important channel, which has the earliest reproduction start time, is given as the selected fragment data at the first, the coded fragment data A1 is first transmitted as shown in FIG. 12B (step S1).

After transmitting the coded fragment data A1, the coded fragment data B2, C2 and D2, for each of which the reproduction start time $T_s$ is after the transmission end time $T_e$ of the coded fragment data A1 and the period of time from the reproduction start time $T_s$ to the transmission end time $T_e$ is minimum, are chosen as candidates for the selected fragment data from the respective channels except the most important channel (step S11). At this point in time, therefore, transmission of the coded fragment data B1, C1 and D1 is abandoned (given up) because the transmission of these data would be too late for the start of reproduction thereof.

Of the selected fragment data candidates B2, C2 and D2, only C2 of which reproduction starts at the time $T_{c2}$ has the minimum period of time d $(=T_s-T_e)$ from the reproduction start time $T_s$ thereof to the transmission end time $T_e$ of the coded fragment data A1 as seen from FIGS. 12A and 12B. Therefore, the coded fragment data C2 is finally chosen as the temporary selected fragment data (steps S12 to S14).

On an assumption that the temporary selected fragment data C2 is transmitted, as seen from FIG. 12C, the estimated end time of transmission of the temporary selected fragment data C2 is before not only the reproduction start time $T_{c2}$ thereof but also the reproduction start time $T_{a2}$ of the coded fragment data A2 of the most important channel to be next transmitted (steps S15 and S16). Accordingly, the temporary selected fragment data C2 is decided as the selected fragment data (step S17) and then transmitted (step S1).

After transmitting the coded fragment data C2, the coded fragment data B2, C3 and D2, for each of which the reproduction start time $T_s$ is after the transmission end time $T_e$ of the coded fragment data C2 and the period of time from the reproduction start time $T_s$ to the transmission end time $T_e$ is minimum, are chosen as candidates for the selected fragment data from the respective channels except the most important channel (step S11).

Of the selected fragment data candidates B2, C3 and D2, only D2 of which reproduction starts at the time $T_{d2}$ has the minimum period of time d $(=T_s-T_e)$ from the reproduction start time $T_s$ there of to the transmission end time $T_e$ of the coded fragment data C2 as seen from FIGS. 12A and 12C. Therefore, the coded fragment data D2 is finally chosen as the temporary selected fragment data (steps S12 to S14).

On an assumption that the temporary selected fragment data D2 is transmitted, as seen from FIG. 12D, the estimated end time of transmission of the temporary selected fragment data D2 is before not only the reproduction start time $T_{d2}$ thereof but also the reproduction start time $T_{a2}$ of the coded fragment data A2 of the most important channel to be next transmitted (steps S15 and S16). Accordingly, the temporary selected fragment data D2 is decided as the selected fragment data (step S17) and then transmitted (step S1).

After transmitting the coded fragment data D2, the coded fragment data B2, C3 and D3, for each of which the reproduction start time $T_s$ is after the transmission end time $T_e$ of the coded fragment data D2 and the period of time from the reproduction start time $T_s$ to the transmission end time $T_e$ is minimum, are chosen as candidates for the selected fragment data from the respective channels except the most important channel (step S11).

Of the selected fragment data candidates B2, C3 and D3, only B2 of which reproduction starts at the time $T_{b2}$ has the minimum period of time d $(=T_s-T_e)$ from the reproduction start time $T_s$ thereof to the transmission end time $T_e$ of the coded fragment data D2 as seen from FIGS. 12A and 12D. Therefore, the coded fragment data B2 is finally chosen as the temporary selected fragment data (steps S12 to S14).

On an assumption that the temporary selected fragment data B2 is transmitted, as seen from FIG. 12E, the estimated end time of transmission of the temporary selected fragment data B2 is not before the reproduction start time $T_{b2}$ thereof (step S15). Then, of the selected fragment data candidates B2, C3 and D3, the candidates C3 and D3, which are not yet finally chosen as the temporary selected fragment data, are checked and subjected to the same processing as described above (step S18).

In this case, of the selected fragment data candidates C3 and D3, only C3 of which reproduction starts at the time $t_{c3}$ has the minimum period of time from the reproduction start time $T_s$ thereof to the transmission end time $T_e$ of the coded fragment data D2 as seen from FIGS. 12A and 12D. Therefore, the coded fragment data C3 is finally chosen as the temporary selected fragment data (steps S12 to S14).

On an assumption that the temporary selected fragment data C3 is transmitted, as seen from FIG. 12F, the estimated end time of transmission of the temporary selected fragment data C3 is before not only the reproduction start time $T_{c3}$ thereof but also the reproduction start time $T_{a2}$ of the coded fragment data A2 of the most important channel to be next transmitted (steps S15 and S16). Accordingly, the temporary selected fragment data C3 is decided as the selected fragment data (step S17) and then transmitted (step S1).

After transmitting the coded fragment data C3, the coded fragment data C4 and D3, for each of which the reproduction start time $T_e$ is after the transmission end time $T_e$ of the coded fragment data C3 and the period of time from the reproduction start time $T_s$ to the transmission end time $T_e$ is minimum, are chosen as candidates for the selected fragment data from the respective channels except the most important channel (step S11).

Of the selected fragment data candidates C4 and D3, only D3 of which reproduction starts at the time $t_{d3}$ has the minimum period of time d ($=T_s-T_e$) from the reproduction start time $T_s$ thereof to the transmission end time $T_e$ of the coded fragment data C3 as seen from FIGS. 12A and 12F. Therefore, the coded fragment data D3 is finally chosen as the temporary selected fragment data (steps S12 to S14).

On an assumption that the temporary selected fragment data D3 is transmitted, the estimated end time of transmission of the temporary selected fragment data D3 is not before the reproduction start time $t_{d3}$ thereof (step S15). Then, of the selected fragment data candidates C4 and D3, the candidate C4, which is not yet finally chosen as the temporary selected fragment data, is checked and subjected to the same processing as described above (step S18). Thus, in this case, the coded fragment data C4 is finally chosen as the temporary selected fragment data. On an assumption that the temporary selected fragment data C4 is transmitted, the estimated end time of transmission of the temporary selected fragment data C4 is before the reproduction start time $T_{c4}$ thereof (step S15), but not before the reproduction start time $T_{a2}$ of the coded fragment data A2 of the most important channel to be next transmitted (step S16). Further, there remains no candidate which is not yet finally chosen as the temporary selected fragment data (step S18). Accordingly, the coded fragment data A2 of the most important channel to be next transmitted is decided as the selected fragment data (step S19) and then transmitted (step S1).

As seen from the above description, when real-time reproduction of the audio signal of the most important channel is essential and the fragment selecting process is executed as shown in FIG. 10, transmission of the coded fragment data B1, B2, C1, C4, D1 and D3 is abandoned.

Next, as a second embodiment of the fragment selecting process, the multiplexer 43 is constructed to preferentially choose, as the selected fragment data, the coded fragment data that has a smaller numeral (referred to as a fragment number hereinafter) in a combination of alphabets and numerals (i.e., A1, A2, B1, B2, C1 to C4, and D1 to $D^3$), and that has higher importance among other channels than the most important channel. In this case, the fragment selecting process in step S5 of FIG. 8 is executed in accordance with, for example, a flowchart shown in FIG. 13.

More specifically, in the fragment selecting process of this case, a candidate for the selected fragment data is first chosen in step S21 from among the coded fragment data for each of the channels except the most important channel as with step S11 of FIG. 10.

The control flow then goes to step S22 where, from among the selected fragment data candidates chosen from the respective channels except the most important channel, one having the highest importance and the other having the second highest importance are chosen, followed by going to step S23. In step S23, of the two candidates (for the selected fragment data) chosen in step S22, one having a smaller fragment number is finally chosen as temporary selected fragment data, followed by going to step S24. Further, in step S23, if the two candidates chosen in step S22 have the same fragment number, one belonging to the channel having higher importance, for example, is finally chosen as temporary selected fragment data.

In step S24, on an assumption that the temporary selected fragment data is transmitted, the estimated end time $(T_t+T_e)$ of transmission of the temporary selected fragment data is estimated as with step S15 of FIG. 10, and whether the estimated end time is before the reproduction start time $T_s$ of the temporary selected fragment data is determined.

If it is determined in step S24 that the estimated end time of transmission of the temporary selected fragment data is before the reproduction start time $T_s$ of the same, the control flow goes to step S25 to determine whether the estimated end time of transmission of the temporary selected fragment data is before the reproduction start time $T_{sm}$ of the fragment of the most important channel to be next transmitted, as with step S16 of FIG. 10.

If it is determined in step S25 that the estimated end time of transmission of the temporary selected fragment data is before the reproduction start time $T_{sm}$ of the fragment of the most important channel to be next transmitted, the control flow goes to step S26 where the temporary selected fragment data is decided as the selected fragment data, followed by returning to the main control flow.

On the other hand, if it is determined in step S24 that the estimated end time of transmission of the temporary selected fragment data is not before the reproduction start time $T_s$ of the same, the control flow goes to step S27 to determine whether any of the two candidates, which are chosen in step S22, remains not yet finally chosen as the temporary selected fragment data. If it is determined in step S27 that any of the two candidates chosen in step S22 remains not yet finally chosen as the temporary selected fragment data, the control flow returns to step S28 where the selected fragment data candidate not yet finally chosen as the temporary selected fragment data is finally chosen as the temporary selected fragment data, followed by returning to step S24 to repeat the subsequent processing in a like manner.

If it is determined in step S27 that there remains no candidate which is chosen in step S22 and not yet finally chosen as the temporary selected fragment data, the control flow goes to step S29 to determine whether any of the selected fragment data candidates chosen in step S21 remains not yet finally chosen as the temporary selected fragment data. If it is determined in step S29 that any selected fragment data candidate remains not yet finally chosen as the temporary selected fragment data, the control flow returns to step S22, following which the above-described processing subsequent to step S22 is repeated on the candidate(s) not yet chosen as the temporary selected fragment data.

Also, if it is determined in step S25 that the estimated end time of transmission of the temporary selected fragment data is not before the reproduction start time $T_{sm}$ of the fragment of the most important channel to be next transmitted, the control flow goes to step S27, following which the same processing as described above is carried out.

On the other hand, if it is determined in step S29 that there remains no selected fragment data candidate which is not yet finally chosen as the temporary selected fragment data, the control flow goes to step S30 where the coded fragment data of the most important channel to be next transmitted is decided as the selected fragment data, followed by returning to the main control flow.

Figure 13:
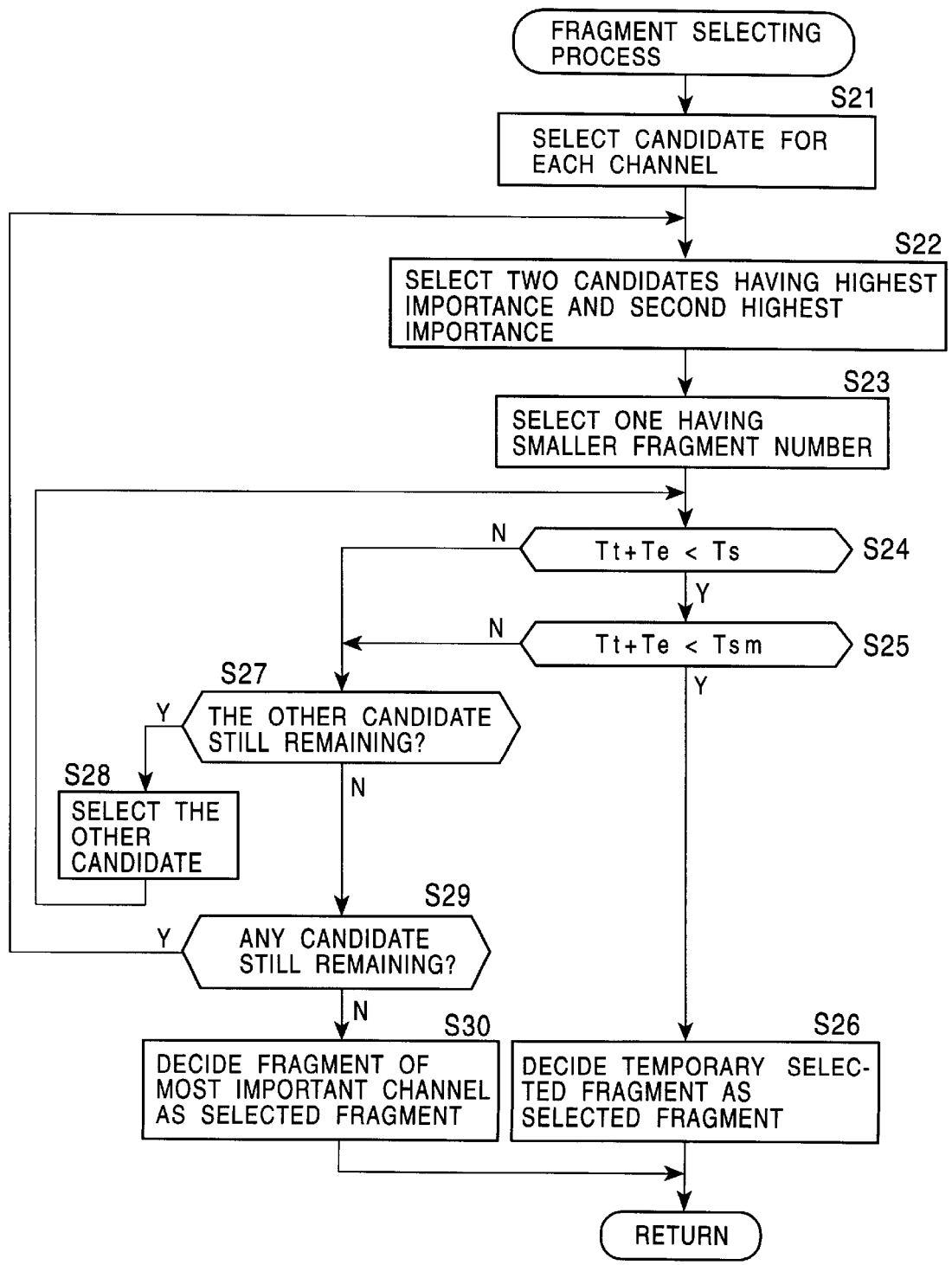
FIG. 13 is a flowchart for explaining a second embodiment of the fragment selecting process executed in step S5 of FIG. 8.

With the fragment selecting process of FIG. 13, the audio signals A to D of four channels shown in FIG. 9 are transmitted as shown in FIGS. 14B to 14G.

Figure 14:
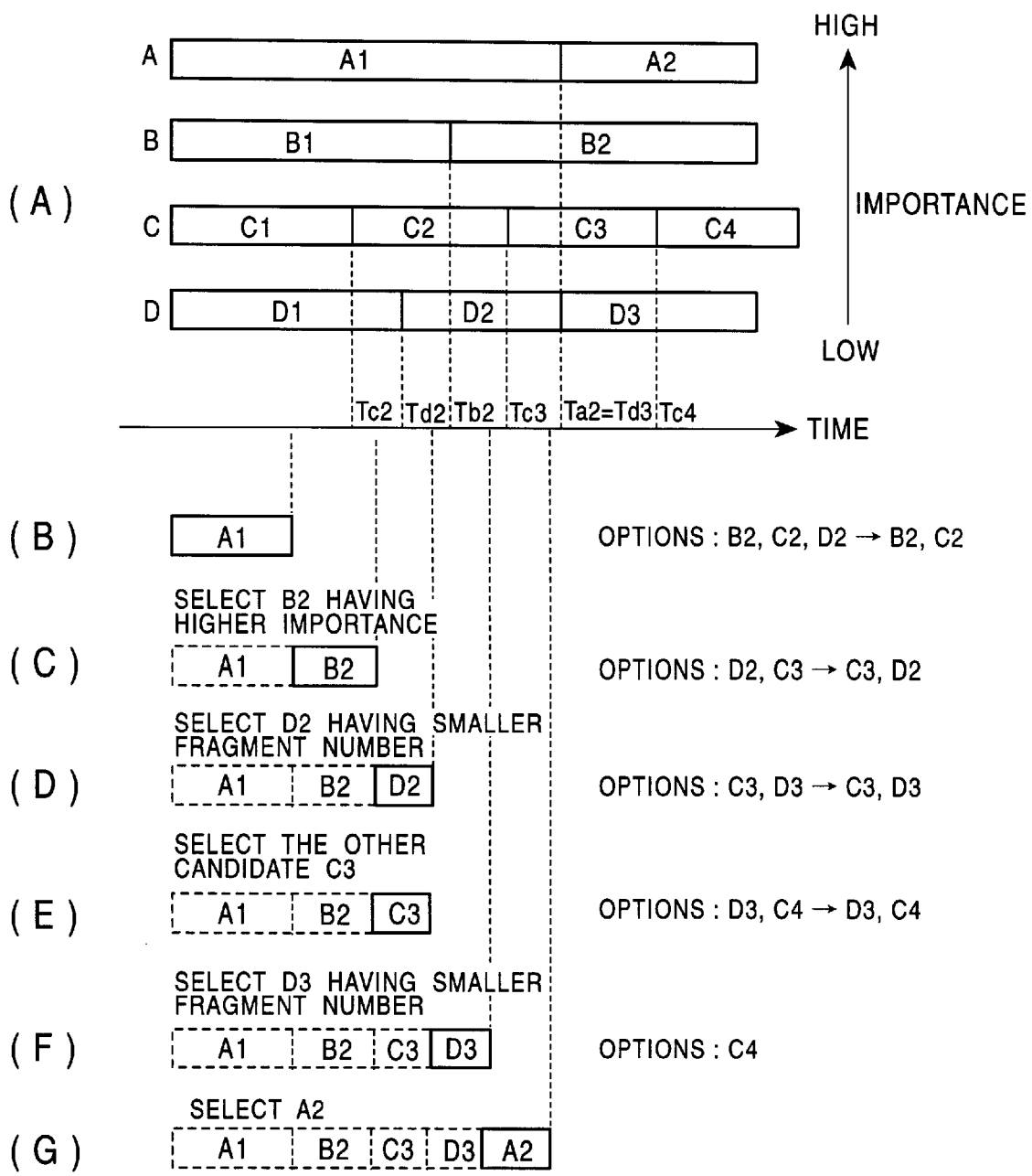
FIGS. 14A to 14G are charts for explaining the fragment selecting process in FIG. 13.

More specifically, as described above in connection with step S1 of FIG. 8, since the coded fragment data of the most important channel, which has the earliest reproduction start time, $T_s$ is given as the selected fragment data at the first, the coded fragment data A1 is first transmitted as shown in FIG. 14B (step S1).

After transmitting the coded fragment data A1, the coded fragment data B2, C2 and D2, for each of which the reproduction start time $T_s$ is after the transmission end time $T_e$ of the coded fragment data A1 and the period of time from the reproduction start time $T_s$ to the transmission end time $T_e$ is minimum, are chosen as candidates for the selected fragment data from the respective channels except the most important channel (step S21). At this point in time, therefore, transmission of the coded fragment data B1, C1 and D1 is abandoned because the transmission of these data would be too late for the start of reproduction thereof.

Of the selected fragment data candidates B2, C2 and D2, the candidates B2 and C2 have the highest importance and the second highest importance, respectively; hence these two candidates are chosen (step S22). Then, of the candidates B2 and C2, one having a smaller fragment number is finally chosen as the temporary selected fragment data (step S23). Here, as mentioned above, if the two candidates have the same fragment number, one having higher importance is chosen. In this case, therefore, the candidate B2 is finally chosen as the temporary selected fragment data.

On an assumption that the temporary selected fragment data B2 is transmitted, as seen from FIG. 14A and 14C, the estimated end time of transmission of the temporary selected fragment data B2 is before not only the reproduction start time $T_{b2}$ thereof but also the reproduction start time $T_{a2}$ of the coded fragment data A2 of the most important channel to be next transmitted (steps S24 and S25). Accordingly, the temporary selected fragment data B2 is decided as the selected fragment data (step S26) and then transmitted (step S1).

After transmitting the coded fragment data B2, the coded fragment data C3 and D2, for each of which the reproduction start time $T_s$ is after the transmission end time $T_e$ of the coded fragment data B2 and the period of time from the reproduction start time $T_s$ to the transmission end time $T_e$ is minimum, are chosen as candidates for the selected fragment data from the respective channels except the most important channel (step S21) (FIGS. 14A and 14C). At this point in time, therefore, transmission of the coded fragment data C2 is abandoned because the transmission of that data would be too late for the start of reproduction thereof.

Since only two C3 and D2 are the selected fragment data candidates, both are chosen as the candidates having the highest importance and the second highest importance (step S22). Then, of the candidates C3 and D2, one D2 having a smaller fragment number is finally chosen as the temporary selected fragment data (step S23).

On an assumption that the temporary selected fragment data D2 is transmitted, as seen from FIG. 14A and 14D, the estimated end time of transmission of the temporary selected fragment data D2 is not before the reproduction start time $T_{d2}$ thereof (step S24). Accordingly, of the two candidates C3 and D2 chosen in step S22, the other C3 not yet finally chosen as the temporary selected fragment data is finally chosen as the temporary selected fragment data (steps S27 and S28).

Further, on an assumption that the temporary selected fragment data C3 is transmitted, as seen from FIG. 14A and 14E, the estimated end time of transmission of the temporary selected fragment data C3 is before not only the reproduction start time $T_{c3}$ thereof but also the reproduction start time $T_{a2}$ of the coded fragment data A2 of the most important channel to be next transmitted (steps S24 and S25). Accordingly, the temporary selected fragment data C3 is decided as the selected fragment data (step S26) and then transmitted (step S1).

After transmitting the coded fragment data C3, the coded fragment data C4 and D3, for each of which the reproduction start time $T_s$ (FIG. 14A) is after the transmission end time $T_e$ (FIG. 14E) of the coded fragment data C3 and the period of time from the reproduction start time $T_s$ to the transmission end time $T_e$ is minimum, are chosen as candidates for the selected fragment data from the respective channels except the most important channel (step S21).

Since only two C4 and D3 are the selected fragment data candidates, both are chosen as the candidates having the highest importance and the second highest importance (step S22). Then, of the candidates C4 and D3, one D3 having a smaller fragment number is finally chosen as the temporary selected fragment data (step S23).

On an assumption that the temporary selected fragment data D3 is transmitted, as seen from FIG. 14A and 14F, the estimated end time of transmission of the temporary selected fragment data D3 is before not only the reproduction start time $t_{d3}$ thereof but also the reproduction start time $T_{a2}$ of the coded fragment data A2 of the most important channel to be next transmitted (steps S24 and S25). Accordingly, the temporary selected fragment data D3 is decided as the selected fragment data (step S26) and then transmitted (step S1).

After transmitting the coded fragment data D3, the coded fragment data C4, for which the reproduction start time $T_s$ (FIG. 14A) is after the transmission end time $T_e$ (FIG. 14F) of the coded fragment data C3 and the period of time from the reproduction start time $T_s$ to the transmission end time $T_e$ is minimum, is chosen as a candidate for the selected fragment data from the respective channels except the most important channel (step S21).

Since only one C4 is the selected fragment data candidate, it is chosen as the candidate having the highest importance (step S22), and then chosen as the candidate having a smaller fragment number (step S23). In other words, the candidate C4 is finally chosen as the temporary selected fragment data.

On an assumption that the temporary selected fragment data C4 is transmitted, the estimated end time of transmission of the temporary selected fragment data C4 is before the reproduction start time $t_{c4}$ thereof (step S24), but not before the reproduction start time $T_{a2}$ of the coded fragment data A2 of the most important channel to be next transmitted (step S25). In addition, there remains no candidate which is not yet finally chosen as the temporary selected fragment data (step S29). Accordingly, the coded fragment data A2 of the most important channel to be next transmitted is decided as the selected fragment data (step S30) and then transmitted (step S1) as shown in FIG. 14G.

As seen from the above description, when real-time reproduction of the audio signal of the most important channel is essential and the fragment selecting process is executed as shown in FIG. 13, transmission of the coded fragment data B1, C1, C2, C4, D1 and D2 is abandoned.

Next, as a third embodiment of the fragment selecting process, the multiplexer 43 is constructed to preferentially choose, as the selected fragment data, the coded fragment data that has a smaller fragment number and has higher importance among other channels than the most important channel, and in addition, when transmission of the coded fragment data of the most important channel to be next transmitted would be too late if the coded fragment data chosen based on the above conditions is chosen as the selected fragment data, to preferentially choose, as the selected fragment data, the coded fragment data that does not impede the transmission of the coded fragment data of the most important channel to be next transmitted. In this case, the fragment selecting process in step S5 of FIG. 8 is executed in accordance with, for example, a flowchart shown in FIG. 15.

More specifically, in the fragment selecting process of this case, the same processing as in steps S21 to S29 of FIG. 13 is executed in steps S31 to S39. Then, if it is determined in step S39 that there remains no selected fragment data candidate which is not yet finally chosen as the temporary selected fragment data, the control flow goes to step S40 where one of the coded fragment data not yet transmitted, for which the reproduction start time $T_s$ is after the transmission end time $T_e$ and the period of time $T_t$ required for transmitting that data is minimum (i.e., the data amount thereof is minimum), is chosen as the temporary selected fragment data.

Subsequently, the control flow goes to step S41 to determine, as with step S16 of FIG. 10, whether the estimated end time of transmission of the temporary selected fragment data is before the reproduction start time $T_{sm}$ of the fragment of the most important channel to be next transmitted.

If it is determined in step S41 that the estimated end time of transmission of the temporary selected fragment data is before the reproduction start time $T_{sm}$ of the fragment of the most important channel to be next transmitted, the control flow goes to step S42 where the temporary selected fragment data is decided as the selected fragment data, followed by returning to the main control flow. In other words, when the transmission of the fragment of the most important channel to be next transmitted is in time for the start of reproduction thereof even if the coded fragment data having the minimum period of time $T_t$ required for the transmission thereof is transmitted, that coded fragment data having the minimum period of time $T_t$ required for the transmission thereof is chosen as the selected fragment data and then transmitted.

On the other hand, if it is determined in step S41 that the estimated end time of transmission of the temporary selected fragment data is not before the reproduction start time $T_{sm}$ of the fragment of the most important channel to be next transmitted, namely, when the transmission of the fragment of the most important channel to be next transmitted would be too late if the coded fragment data having the minimum period of time $T_t$ required for the transmission thereof is transmitted, the control flow goes to step S43 where the fragment of the most important channel to be next transmitted is decided as the selected fragment data, followed by returning to the main control flow.

Figure 15:
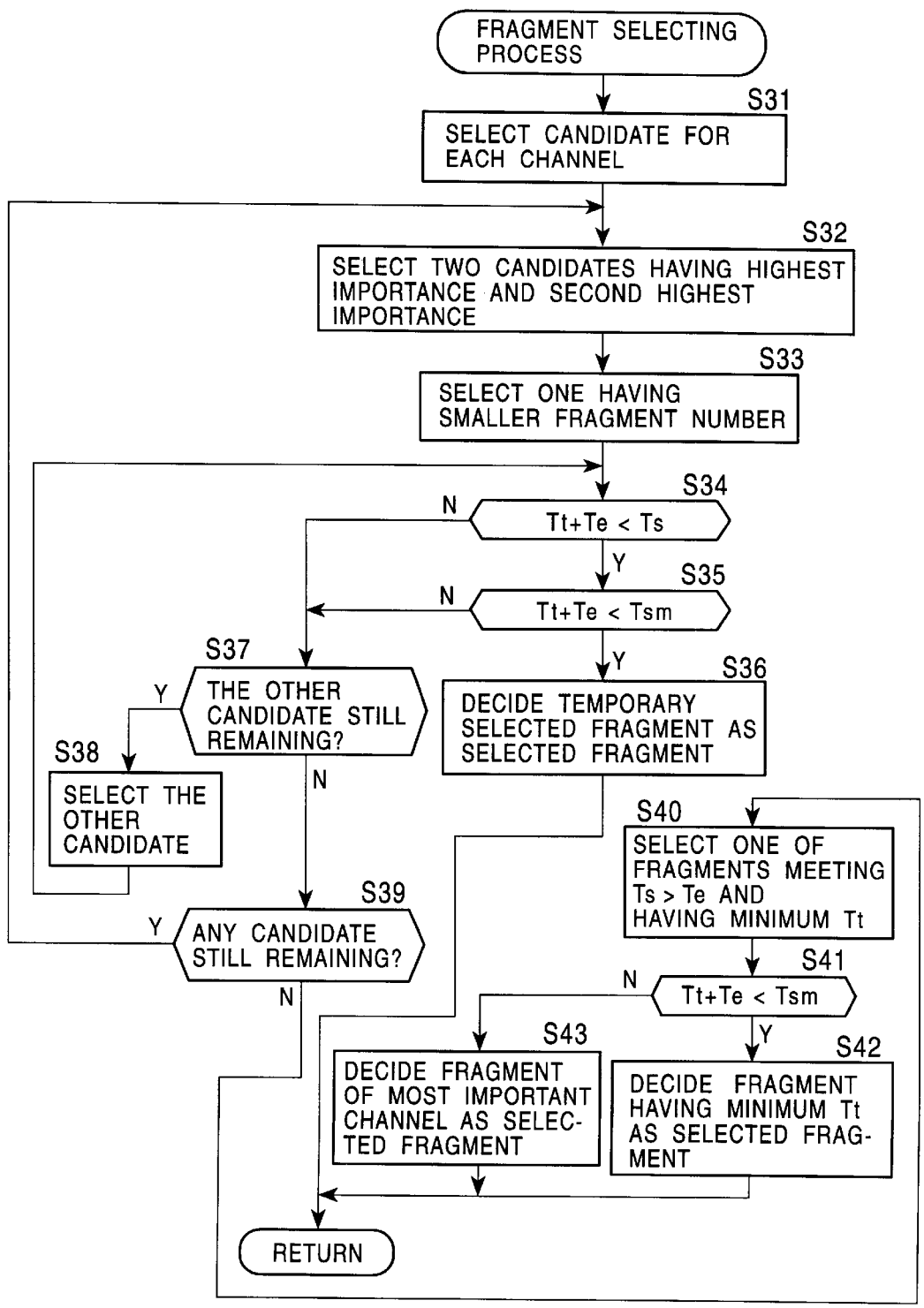
FIG. 15 is a flowchart for explaining a third embodiment of the fragment selecting process executed in step S5 of FIG. 8.

With the fragment selecting process of FIG. 15, audio signals of multiple channels are transmitted, for example, as shown in FIGS. 16A to 16I.

Figure 16:
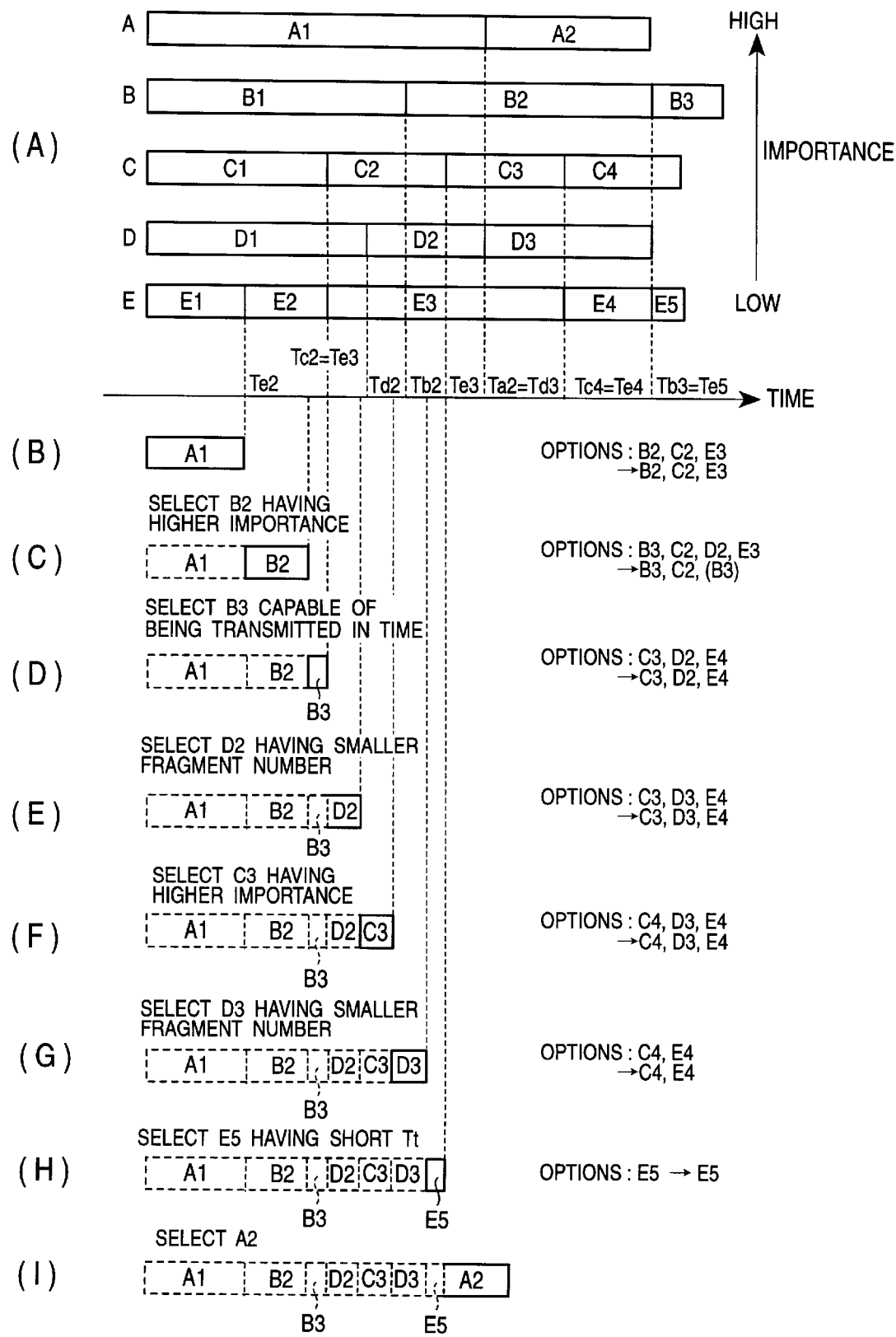
FIGS. 16A to 16I are charts for explaining the fragment selecting process in FIG. 15.

For convenience of description, it is supposed that a piece of music made up of audio signals A, B, C, D and E of five channels, shown in FIG. 16A, are transmitted.

In an example of FIG. 16A, therefore, the channel of the audio signal A has the highest importance, and the channels of the audio signals B, C, D have importance descending in this order. The channel of the audio signal E has the lowest importance.

Also, the audio signals A, C and D are each divided similarly to the case of FIG. 9. The audio signal B is divided into three fragments B1, B2 and B3. The fragments B1 and B2 are the same as those in the case of FIG. 9. Accordingly, the audio signal B shown in FIG. 16A is constructed by adding the fragment B3 to the fragments B1 and B2. Note that the fragment B3 has the reproduction start time $T_{b3}$ ($<T_{e5}$).

Furthermore, in FIG. 16A, the audio signal E is divided into five fragments E1, E2, E3, E4 and E5. The reproduction start time of the fragment E1 is coincident with the reproduction start time of the fragment A1 (B1, C1, D1), and the fragments E2 to E5 have the reproduction start time $T_{e2}$ to $T_{e5}$, respectively. As shown, the relation of $T_{e2}<T_{e3}<e_{t4}<T_{t5}$ is set in the example of FIG. 16A. Additionally, the time $T_{e3}$ is coincident with the time $t_{c2}$f $T_{e4}$ is coincident with the time $T_{e4}$, and $T_{e5}$ is coincident with the time $T_{b3}$, respectively.

With the fragment selecting process of FIG. 15, the audio signals A to E of five channels shown in FIG. 16A are transmitted as shown in FIGS. 16B to 16I.

More specifically, as described above in connection with step S1 of FIG. 8, since the coded fragment data of the most important channel, which has the earliest reproduction start time, is given as the selected fragment data at the first, the coded fragment data A1 is first chosen as the selected fragment data and then transmitted as shown in FIG. 16B (step S1).

After transmitting the coded fragment data A1, the coded fragment data B2, C2, D2 and E3, for each of which the reproduction start time $T_s$ is after the transmission end time $T_e$ of the coded fragment data A1 and the period of time from the reproduction start time $T_s$ to the transmission end time $T_e$ is minimum, are chosen as candidates for the selected fragment data from the respective channels except the most important channel (step S31). At this point in time, therefore, transmission of the coded fragment data B1, C1, D1, E1 and E2 is abandoned because the transmission of these data would be too late for the start of reproduction thereof.

Of the selected fragment data candidates B2, C2, D2 and E3, the candidates B2 and C2 have the highest importance and the second highest importance, respectively; hence these two candidates are chosen (step S32). Then, of the candidates B2 and C2, one having a smaller fragment number is finally chosen as the temporary selected fragment data (step S33). Here, as mentioned above, if the two candidates have the same fragment number, one having higher importance is chosen. In this case, therefore, the candidate B2 is finally chosen as the temporary selected fragment data.

On an assumption that the temporary selected fragment data B2 is transmitted, as seen from FIGS. 16A and 16C, the estimated end time of transmission of the temporary selected fragment data B2 is before not only the reproduction start time $T_{b2}$ thereof but also the reproduction start time $T_{a2}$ of the coded fragment data A2 of the most important channel to be next transmitted (steps S34 and S35). Accordingly, the temporary selected fragment data B2 is decided as the selected fragment data (step S36) and then transmitted (step S1).

After transmitting the coded fragment data B2, the coded fragment data B3, C2, D2 and E3, for each of which the reproduction start time $T_s$ (FIG. 16A) is after the transmission end time $T_e$ (FIG. 16C) of the coded fragment data B2 and the period of time from the reproduction start time $T_s$ to the transmission end time $T_e$ is minimum, are chosen as candidates for the selected fragment data from the respective channels except the most important channel (step S31).

Of the selected fragment data candidates B3, C2, D2 and E3, the candidates B3 and C2 have the highest importance and the second highest importance, respectively; hence these two candidates are chosen (step S32). Then, of the candidates B3 and C2, one C2 having a smaller fragment number is finally chosen as the temporary selected fragment data (step S33).

On an assumption that the temporary selected fragment data C2 is transmitted, the estimated end time of transmission of the temporary selected fragment data C2 is not before the reproduction start time $T_{c2}$ thereof (step S34). Accordingly, of the two candidates B3 and C2 chosen in step S32, the other B3 not yet finally chosen as the temporary selected fragment data is finally chosen as the temporary selected fragment data (steps S37 and S38).

Further, on an assumption that the temporary selected fragment data B3 is transmitted, as seen from FIGS. 16A and 16D, the estimated end time of transmission of the temporary selected fragment data B3 is before not only the reproduction start time $T_{b3}$ thereof but also the reproduction start time $T_{a2}$ of the coded fragment data A2 of the most important channel to be next transmitted (steps S34 and S35). Accordingly, the temporary selected fragment data B3 is decided as the selected fragment data (step S36) and then transmitted (step S1).

After transmitting the coded fragment data B3, the coded fragment data C3, D2 and E4, for each of which the reproduction start time $T_s$ (FIG. 16A) is after the transmission end time $T_e$ (FIG. 16D) of the coded fragment data B3 and the period of time from the reproduction start time $T_s$ to the transmission end time $T_e$ is minimum, are chosen as candidates for the selected fragment data from the respective channels except the most important channel (step S31). At this point in time, therefore, transmission of the coded fragment data C2 and E3 is abandoned because the transmission of these data would be too late for the start of reproduction thereof.

Of the selected fragment data candidates C3, D2 and E4, the candidates C3 and D2 have the highest importance and the second highest importance, respectively; hence these two candidates are chosen (step S32). Then, of the candidates C3 and D2, one D2 having a smaller fragment number is finally chosen as the temporary selected fragment data (step S33).

On an assumption that the temporary selected fragment data D2 is transmitted, as seen from FIGS. 16A and 16E, the estimated end time of transmission of the temporary selected fragment data D2 is before not only the reproduction start time $T_{d2}$ thereof but also the reproduction start time $T_{a2}$ of the coded fragment data A2 of the most important channel to be next transmitted (steps S34 and S35). Accordingly, the temporary selected fragment data. D2 is decided as the selected fragment data (step S36) and then transmitted (step S1).

After transmitting the coded fragment data D2, the coded fragment data C3, D3 and E4, for each of which the reproduction start time $T_s$ (FIG. 16A) is after the transmission end time $T_e$ (FIG. 16E) of the coded fragment data D2 and the period of time from the reproduction start time $T_s$ to the transmission end time $T_e$ is minimum, are chosen as candidates for the selected fragment data from the respective channels except the most important channel (step S31).

Of the selected fragment data candidates C3, D3 and E4, the candidates C3 and D3 have the highest importance and the second highest importance, respectively; hence these two candidates are chosen (step S32). Then, since the candidates C3 and D3 have the same fragment number, one C3 of the channel having higher importance is finally chosen as the temporary selected fragment data (step S33).

On an assumption that the temporary selected fragment data C3 is transmitted, as seen from FIGS. 16A and 16F, the estimated end time of transmission of the temporary selected fragment data C3 is before not only the reproduction start time $T_{c3}$ thereof but also the reproduction start time $T_{a2}$ of the coded fragment data A2 of the most important channel to be next transmitted (steps S34 and S35). Accordingly, the temporary selected fragment data C3 is decided as the selected fragment data (step S36) and then transmitted (step S1).

After transmitting the coded fragment data C3, the coded fragment data C4, D3 and E4, for each of which the reproduction start time $T_s$ (FIG. 16A) is after the transmission end time $T_e$ (FIG. 16F) of the coded fragment data C3 and the period of time from the reproduction start time $T_s$ to the transmission end time $T_e$ is minimum, are chosen as candidates for the selected fragment data from the respective channels except the most important channel (step S31).

Of the selected fragment data candidates C4, D3 and E4, the candidates C4 and D3 have the highest importance and the second highest importance, respectively; hence these two candidates are chosen (step S32). Then, of the candidates C4 and D3, one D3 having a smaller fragment number is finally chosen as the temporary selected fragment data (step S33).

On an assumption that the temporary selected fragment data D3 is transmitted, as seen from FIGS. 16A and 16G, the estimated end time of transmission of the temporary selected fragment data D3 is before not only the reproduction start time $t_{d3}$ thereof but also the reproduction start time $T_{a2}$ of the coded fragment data A2 of the most important channel to be next transmitted (steps S34 and S35). Accordingly, the temporary selected fragment data D3 is decided as the selected fragment data (step S36) and then transmitted (step S1).

After transmitting the coded fragment data D3, the coded fragment data C4 and E4, for each of which the reproduction start time $T_s$ (FIG. 16A) is after the transmission end time $T_e$ (FIG. 16G) of the coded fragment data D3 and the period of time from the reproduction start time $T_e$ to the transmission end time $T_e$ is minimum, are chosen as candidates for the selected fragment data from the respective channels except the most important channel (step S31).

The selected fragment data candidates are now only two C4 and E4; hence these two candidates are chosen as having the highest importance and the second highest importance (step S32). Then, since the candidates C4 and D4 have the same fragment number, one C4 having higher importance is finally chosen as the temporary selected fragment data (step S33).

On an assumption that the temporary selected fragment data C4 is transmitted, the estimated end time of transmission of the temporary selected fragment data C4 is before the reproduction start time $t_{c4}$ thereof (step S34), but not before the reproduction start time $T_{a2}$ of the coded fragment data A2 of the most important channel to be next transmitted (step S35). Accordingly, of the two candidates C4 and E4 chosen in step S32, the other E4 not yet finally chosen as the temporary selected fragment data is finally chosen as the temporary selected fragment data (steps S37 and S38).

Further, on an assumption that the temporary selected fragment data E4 is transmitted, the estimated end time of transmission of the temporary selected fragment data E4 is before the reproduction start time $T_{e4}$ thereof (step S34), but not before the reproduction start time $T_{a2}$ of the coded fragment data A2 of the most important channel to be next transmitted (step S35). In addition, there remains at this point in time no candidate which is not yet finally chosen as the temporary selected fragment data (step S39). Then, one of the coded fragment data not yet transmitted, for which the reproduction start time $T_s$ is after the transmission end time $T_e$ (FIG. 16G) of the coded fragment data D3 and the period of time $T_t$ required for the transmission thereof is minimum; namely, the coded fragment data E5 in this case, is chosen from among the fragments C4, E4 and E5 shown in FIG. 16A (step S40). At this point in time, therefore, transmission of the coded fragment data C4 and E4 is abandoned.

On an assumption that the coded fragment data E5 is transmitted, as seen from FIGS. 16A and 16H, the estimated end time of transmission of the coded fragment data E5 is before the reproduction start time $T_{a2}$ of the coded fragment data A2 of the most important channel to be next transmitted (step S41). Accordingly, the coded fragment data E5 is decided as the selected fragment data (step S42) and then transmitted (step S1).

Stated otherwise, in this case, the coded fragment data E5, which can be transmitted during the period of time from the transmission end time $T_e$ of the coded fragment data D3 to the reproduction start time $T_{a2}$ of the coded fragment data A2 of the most important channel to be next transmitted, is transmitted prior to the transmission of the coded fragment data A2.

After transmitting the coded fragment data E5, there remains no coded fragment data E4 of which estimated end time is before the reproduction start time $T_{a2}$ of the coded fragment data A2 of the most important channel to be next transmitted (step S41). Accordingly, the coded fragment data A2 of the most important channel to be next transmitted is decided as the selected fragment data (step S43) and then-transmitted (step S1) as shown in FIG. 16I.

As seen from the above description, when real-time reproduction of the audio signal of the most important channel is essential and the fragment selecting process is executed as shown in FIG. 15, transmission of the coded fragment data B1, C1, C2, C4, D1 and E1 to E4 is abandoned.

Figure 18:
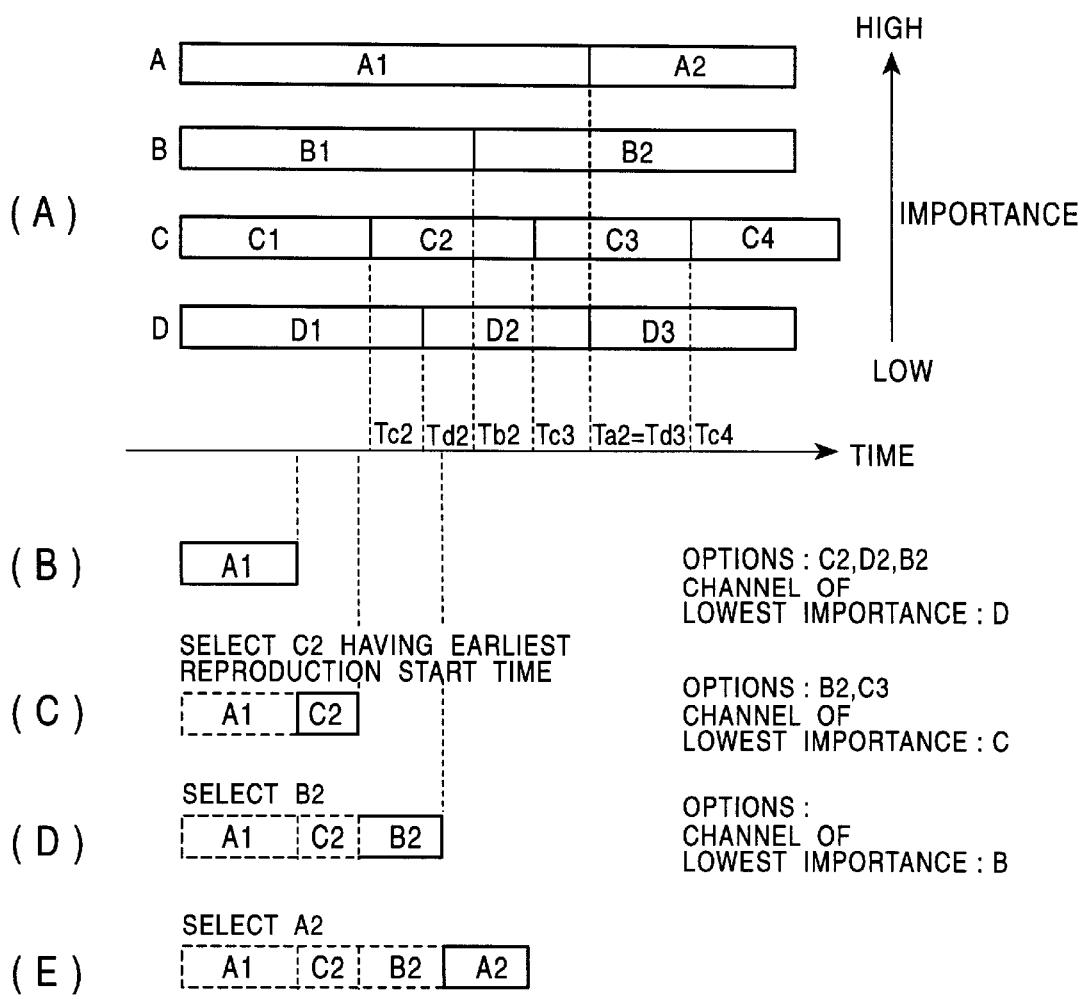
FIGS. 18A to 18E are charts for explaining the fragment selecting process in FIG. 17.

Next, as a fourth embodiment of the fragment selecting process, in addition to preferentially choose, as the selected fragment data, (1) the coded fragment data having the earlier reproduction start time and (2) the coded fragment data having higher importance if the reproduction start time is the same, the multiplexer 43 is constructed not to choose, as the selected fragment data, the coded fragment data having importance lower than the importance of the coded fragment data that has been chosen as the selected fragment data, after the coded fragment data of the most important channel having the earliest reproduction start time was transmitted as the selected fragment data. In this case, the fragment selecting process in step S5 of FIG. 8 is executed in accordance with, for example, a flowchart shown in FIG. 18.

More specifically, in the fragment selecting process of this case, the same processing as in steps S11 to S19 of FIG. 10 is executed in steps S51 to S56. Then, if it is determined in step S56 that the estimated end time of transmission of the coded fragment data is before the reprouction start time $T_{sm}$ of the fragment of the most important channel to be next transmitted, the control flow goes to step S57 to determine whether the importance of channel of the temporary selected fragment data is not lower than the lowest of importance levels of respective channels of the coded fragment data chosen as the selected fragment data (referred to as the lowest importance) after the coded fragment data of the most important channel having the earliest reproduction start time was transmitted as the selected fragment data.

If it is determined in step S57 that the importance of channel of the temporary selected fragment data is not lower than the lowest importance, the control flow goes to step S58 where the temporary selected fragment data is decided as the selected fragment data as with step S17 of FIG. 10, followed by returning to the main control flow.

On the other hand, if it is determined in step S57 that the importance of channel of the temporary selected fragment data is lower than the lowest importance, the control flow goes to step S59 to determine whether any of the selected fragment data candidates chosen in step S51 remains not yet finally chosen as the temporary selected fragment data. If it is determined in step S59 that any selected fragment data candidate remains not yet finally chosen as the temporary selected fragment data, the control flow returns to step S52, following which the processing subsequent to step S52 is repeated on the candidate not yet chosen as the temporary selected fragment data.

If it is determined in step S59 that there remains no selected fragment data candidate which is not yet finally chosen as the,temporary selected fragment data, the control flow goes to step S60 where the coded fragment data of the most important channel to be next transmitted is decided as the selected fragment data, followed by returning to the main control flow.

Thus, the coded fragment data of the channel having lower importance than the lowest importance is not chosen as the selected fragment data and hence not transmitted.

Figure 17:
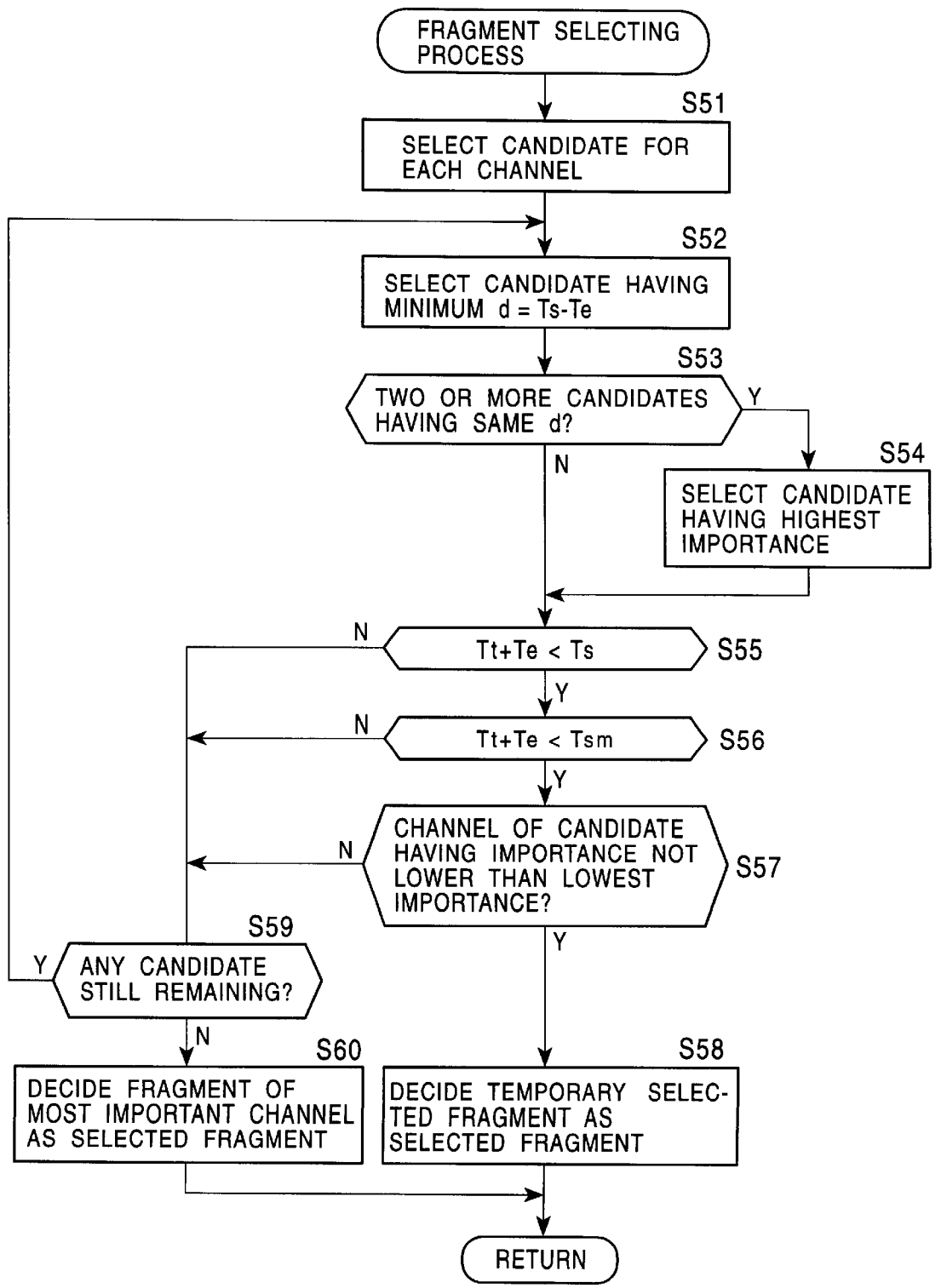
FIG. 17 is a flowchart for explaining a fourth embodiment of the fragment selecting process executed in step S5 of FIG. 8.

With the fragment selecting process of FIG. 17, the audio signals A to D of four channels shown in FIG. 9 are transmitted as shown in FIGS. 18A to 18E.

More specifically, the coded fragment data A1 of the most important channel, which has the earliest reproduction start time, is first chosen as the selected fragment data and then transmitted as shown in FIG. 18B (step S1).

After transmitting the coded fragment data A1, the coded fragment data B2, C2 and D2, for each of which the reproduction start time $T_s$ is after the transmission end time $T_e$ of the coded fragment data A1 and the period of time from the reproduction start time $T_s$ to the transmission end time $T_e$ is minimum, are chosen as candidates for the selected fragment data from the respective channels except the most important channel (step S51). At this point in time, therefore, transmission of the coded fragment data B1, C1 and D1 is abandoned because the transmission of these data would be too late for the start of reproduction thereof.

Of the selected fragment data candidates B2, C2 and D2, only C2 of which reproduction starts at the time TC2 has the minimum period of time d ($=T_s-T_e$) from the reproduction start time $T_s$ thereof to the transmission end time $T_e$ of the coded fragment data A1 as seen from FIG. 18A. Therefore, the coded fragment data C2 is finally chosen as the temporary selected fragment data (steps S52 to S54).

On an assumption that the temporary selected fragment data C2 is transmitted, as seen from FIG. 18C, the estimated end time of transmission of the temporary selected fragment data C2 is before not only the reproduction start time $T_{c2}$ thereof but also the reproduction start time $T_{a2}$ of the coded fragment data A2 of the most important channel to be next transmitted (steps S55 and S56). Accordingly, the temporary selected fragment data C2 is decided as the selected fragment data (step S58) and then transmitted (step S1).

Immediately after transmitting the coded fragment data A1 of the most important channel which has the earliest reproduction start time, the lowest of importance levels of the channels A to D is set to the lowest importance. The coded fragment data C2 of the channel C is therefore chosen as the selected fragment data because the importance thereof is not lower than the lowest importance (S57).

Also, the lowest importance is changed to the importance of the channel C after the coded fragment data C2 of the channel C has been chosen as the selected fragment data.

After transmitting the coded fragment data C2, the coded fragment data B2, C3 and D2, for each of which the reproduction start time $T_s$ is after the transmission end time $T_e$ of the coded fragment data C2 and the period of time from the reproduction start time $T_s$ to the transmission end time $T_e$ is minimum, are chosen as candidates for the selected fragment data from the respective channels except the most important channel (step S51).

Of the selected fragment data candidates B2, C3 and D2, only the coded fragment data D2 of which reproduction starts at the time $T_{d2}$ has the minimum period of time d (=$T_s$-$T_e$) from the reproduction start time $T_s$ thereof to the transmission end time $T_e$ of the coded fragment data C2 as seen from FIG. 18A. Therefore, the coded fragment data D2 is finally chosen as the temporary selected fragment data (steps S52 to S54).

On an assumption that the temporary selected fragment data D2 is transmitted, the estimated end time of transmission of the temporary selected fragment data D2 is before not only the reproduction start time $T_{d2}$ thereof but also the reproduction start time $T_{a2}$ of the coded fragment data A2 of the most important channel to be next transmitted (steps S55 and S56). However, the importance of the coded fragment data D2 is lower than the lowest importance, i.e., the importance of the channel C, at this point in time. Accordingly, the temporary selected fragment data D2 is not chosen as the selected fragment data (step S57).

Then, of the selected fragment data candidates B2, C3 and D2, the candidate B2 and C3, which are not yet finally chosen as the temporary selected fragment data, are checked and subjected to the same processing as described above (step S59). In this case, of the selected fragment data candidates B2 and C3, the candidate B2 having the minimum period of time d from the reproduction start time T3 thereof to the transmission end time $T_e$ of the coded fragment data B2 is chosen as the temporary selected fragment data (steps S52 to S54).

On an assumption that the temporary selected fragment data B2 is transmitted, as seen from FIGS. 18D, the estimated end time of transmission of the temporary selected fragment data B2 is before not only the reproduction start time $T_{b2}$ thereof but also the reproduction start time $T_{a2}$ of the coded fragment data A2 of the most important channel to be next transmitted (steps S55 and S56). In addition, the importance of the coded fragment data B2 is not lower than the lowest importance, i.e., the importance of the channel C (step S57). Accordingly, the temporary selected fragment data B2 is decided as the selected fragment data (step S58) and then transmitted (step S1).

Here, the lowest importance is changed to the importance of the channel B after the coded fragment data B2 of the channel B has been chosen as the selected fragment data.

After transmitting the coded fragment data B2, the coded fragment data C3 and D3, for each of which the reproduction start time $T_s$ is after the transmission end time $T_e$ of the coded fragment data B2 and the period of time from the reproduction start time $T_s$ to the transmission end time $T_e$ is minimum, are chosen as candidates for the selected fragment data from the respective channels except the most important channel (step S51).

However, the importance of each coded fragment data C3, D3 is lower than the lowest importance, i.e., the importance of the channel B, at this point in time. Accordingly, the temporary selected fragment data C3 and D3 are not chosen as the selected fragment data (step S57).

Further, since there remains no more coded fragment data which is not yet transmitted and belongs to any of the channels, except the most important channel, having the importance not lower than that of the channel B as the lowest importance, i.e., belongs to the channel B here, the coded fragment data A2 of the most important channel to be next transmitted is decided as the selected fragment data (step S60) and then transmitted (step S1) as shown in FIG. 18E.

In the fragment selecting process of FIG. 17, therefore, only A1, C2, B2 and A2 of the coded fragment data shown in FIG. 9 are transmitted and the number of the coded fragment data transmitted is smaller than in the above-described cases of FIGS. 10, 13 and 15, but the coded fragment data can be transmitted with an allowance increased correspondingly.

In the above-described fragment selecting processes, it is supposed that the network 2 if free from any delay, and at the same time as when the coded fragment data A1 of the most important channel, which has the earliest reproduction start time, is transmitted, the coded fragment data A1 is received and decoded in the client terminal 3, i.e., that the transmission start time of the coded fragment data A1 is identical to the reproduction start time thereof. Hence, the coded fragment data B1, C1 and D1 having the same reproduction start time as the coded fragment data A1 in FIG. 9, are not transmitted for the reason that the transmission of those data would be too late for the start of reproduction thereof. However, when the client terminal 3 is constructed, for example, such that a buffer 61A is incorporated in the receiving circuit 61 as indicated by dotted lines in FIG. 6 and the coded fragment data (coded data) received from the network 2 is supplied to the decoding circuit 62 after being temporarily stored in the buffer 61A, the coded fragment data B1, C1 and D1 having the same reproduction start time as the coded fragment data A1 can also be transmitted in time for the start of reproduction thereof.

Stated otherwise, in this case, since the coded fragment data is decoded and reproduced in the client terminal 3 after being temporarily stored in the buffer 61A, the reproduction start time of the coded fragment data A1 is delayed from the transmission start time thereof by a time for which the received coded fragment data is held stored in the buffer 61A (referred to as a buffering time hereinafter), as shown in FIG. 19A. By setting the buffering time to be longer than the period of time required for transmitting the coded fragment data A1, therefore, it becomes possible to transmit even the coded fragment data B1, C1 and D1 having the same reproduction start time as the coded fragment data A1 in time for the start of reproduction thereof.

More specifically, the fragment selecting process is executed as follows when the buffering time is set as shown in FIG. 19A, for example, and appropriate one of the coded fragment data is chosen as the selected fragment data by the fragment selecting process described above in connection with FIG. 10. After transmitting the coded fragment data A1 as shown in FIG. 19B, the coded fragment data B1, C1 and D1, for each of which the reproduction start time $T_s$ is after the transmission end time $T_e$ of the coded fragment data C2 and the period of time from the reproduction start time $T_s$ to the transmission end time $T_e$ is minimum, are chosen as candidates for the selected fragment data from the respective channels except the most important channel (step S11).

Of the selected fragment data candidates B1, C1 and D1, all these candidates have the same minimum period of time d ($=T_s-T_e$) from the reproduction start time $T_s$ thereof to the transmission end time $T_e$ of the coded fragment data. A1 as seen from FIGS. 19A and 19B. Therefore, the coded fragment data B1 having the highest importance among B1, C1 and D1 is finally chosen as the temporary selected fragment data (steps S12 to S14).

On an assumption that the temporary selected fragment data B1 is transmitted, as seen from FIG. 19C, the estimated end time of transmission of the temporary selected fragment data B1 is before not only the reproduction start time $T_{d2}$ thereof but also the reproduction start time $T_{a2}$ of the coded fragment data A2 of the most important channel to be next transmitted (steps S15 and S16). Accordingly, the temporary selected fragment data B1 is decided as the selected fragment data (step S17) and then transmitted (step S1).

After transmitting the coded fragment data B1, the coded fragment data B2, C1 and D1, for each of which the reproduction start time $T_s$ is after the transmission end time $T_e$ of the coded fragment data B1 and the period of time from the reproduction start time $T_s$ to the transmission end time $T_e$ is minimum, are chosen as candidates for the selected fragment data from the respective channels except the most important channel (step S11).

Of the selected fragment data candidates B2, C1 and D1, two C1 and D1 have the same minimum period of time d ($=T_s-T_e$) from the reproduction start time $T_s$ thereof to the transmission end time $T_e$ of the coded fragment data B1 as seen from FIGS. 19A and 19C. Therefore, the coded fragment data. C1 having higher importance among them is finally chosen as the temporary selected fragment data (steps S12 to S14).

On an assumption that the temporary selected fragment data C1 is transmitted, as seen from FIG. 19D, the estimated end time of transmission of the temporary selected fragment data C1 is before not only the reproduction start time $T_{c1}$ thereof but also the reproduction start time $T_{a2}$ of the coded fragment data A2 of the most important channel to be next transmitted (steps S15 and S16). Accordingly, the temporary selected fragment data C1 is decided as the selected fragment data (step S17) and then transmitted (step S1).

After transmitting the coded fragment data C1, the coded fragment data B2, C2 and D1, for each of which the reproduction start time $T_s$ is after the transmission end time $T_e$ of the coded fragment data C1 and the period of time from the reproduction start time $T_s$ to the transmission end time $T_e$ is minimum, are chosen as candidates for the selected fragment data from the respective channels except the most important channel (step S11).

Of the selected fragment data candidates B2, C2 and D1, only D1 has the minimum period of time d ($=T_s-T_e$) from the reproduction start time $T_s$ thereof to the transmission end time $T_e$ of the coded fragment data C1 as seen from FIGS. 19A and 19D. Therefore, the candidate D1 is finally chosen as the temporary selected fragment data (steps S12 to S14).

On an assumption that the temporary selected fragment data D1 is transmitted, as seen from FIG. 19D, the estimated end time of transmission of the temporary selected fragment data D1 is not before the reproduction start time thereof. Accordingly, of the selected fragment data candidates B2, C3 and D1 chosen in step S11, the candidates B2 and C2, which are not yet finally chosen as the temporary selected fragment data, are checked and subjected to the same processing as described above. Hence, at this point in time, transmission of the coded fragment data D1 is abandoned.

Of the selected fragment data candidates B2 and C2, only C2 of which reproduction starts at the time $T_{c2}$ has the minimum period of time d from the reproduction start time $T_s$ thereof to the transmission end time $T_e$ of the coded fragment data C1 as seen from FIGS. 19A and 19D. Therefore, the candidate C2 is finally chosen as the temporary selected fragment data (steps S12 to S14).

On an assumption that the temporary selected fragment data C2 is transmitted, as seen from FIG. 19E, the estimated end time of transmission of the temporary selected fragment data C2 is before not only the reproduction start time $T_{c2}$ thereof but also the reproduction start time $T_{a2}$ of the coded fragment data A2 of the most important channel to be next transmitted (steps S15 and S16). Accordingly, the temporary selected fragment data C2 is decided as the selected fragment data (step S17) and then transmitted (step S1).

After transmitting the coded fragment data C2, the coded fragment data B2, C3 and D2, for each of which the reproduction start time $T_s$ is after the transmission end time $T_e$ of the coded fragment data C2 and the period of time from the reproduction start time $T_s$ to the transmission end time $T_e$ is minimum, are chosen as candidates for the selected fragment data from the respective channels except the most important channel (step S11).

Of the selected fragment data candidates B2, C3 and D2, only D2 of which reproduction starts at the time $T_{d2}$ has the minimum period of time d from the reproduction start time $T_s$ thereof to the transmission end time $T_e$ of the coded fragment data C2 as seen from FIGS. 19A and 19E. Therefore, the coded fragment data D2 is finally chosen as the temporary selected fragment data (steps S12 to S14).

On an assumption that the temporary selected fragment data D2 is transmitted, as seen from FIG. 19F, the estimated end time of transmission of the temporary selected fragment data D2 is before not only the reproduction start time $T_{d2}$ thereof but also the reproduction start time $T_{a2}$ of the coded fragment data A2 of the most important channel to be next transmitted (steps S15 and S16). Accordingly, the temporary selected fragment data D2 is decided as the selected fragment data (step S17) and then transmitted (step S1).

After transmitting the coded fragment data D2, the coded fragment data B2, C3 and D3, for each of which the reproduction start time $T_s$ is after the transmission end time $T_e$ of the coded fragment data D2 and the period of time from the reproduction start time $T_s$ to the transmission end time $T_e$ is minimum, are chosen as candidates for the selected fragment data from the respective channels except the most important channel (step S11).

Of the selected fragment data candidates B2, C3 and D3, only B2 of which reproduction starts at the time $T_{b2}$ has the minimum period of time d from the reproduction start time $T_e$ thereof to the transmission end time $T_e$ of the coded fragment data D2 as seen from FIGS. 19A and 19F. Therefore, the coded fragment data B2 is finally chosen as the temporary selected fragment data (steps S12 to S14).

On an assumption that the temporary selected fragment data B2 is transmitted, as seen from FIG. 19G, the estimated end time of transmission of the temporary selected fragment data B2 is before not only the reproduction start time $T_{b2}$ thereof but also the reproduction start time $T_{a2}$ of the coded fragment data A2 of the most important channel to be next transmitted (steps S15 and S16). Accordingly, the temporary selected fragment data B2 is decided as the selected fragment data (step S17) and then transmitted (step S1).

After transmitting the coded fragment data B2, the coded fragment data C3 and D3, for each of which the reproduction start time $T_s$ is after the transmission end time $T_e$ of the coded fragment data B2 and the period of time from the reproduction start time $T_s$ to the transmission end time $T_e$ is minimum, are chosen as candidates for the selected fragment data from the respective channels except the most important channel a(step S11).

Of the selected fragment data candidates C3 and D3, only C3 of which reproduction starts at the time $T_{c3}$ has the minimum period of time d ($=T_s-T_e$) from the reproduction start time $T_s$ thereof to the transmission end time $T_e$ of the coded fragment data B2 as seen from FIGS. 19A and 19G. Therefore, the coded fragment data C3 is finally chosen as the temporary selected fragment data (steps S12 to S14).

On an assumption that the temporary selected fragment data C3 is transmitted, as seen from FIG. 19H, the estimated end time of transmission of the temporary selected fragment data C3 is before not only the reproduction start time $T_{c3}$ thereof but also the reproduction start time $T_{a2}$ of the coded fragment data A2 of the most important channel to be next transmitted (steps S15 and S16). Accordingly, the temporary selected fragment data C3 is decided as the selected fragment data (step S17) and then transmitted (step S1).

After transmitting the coded fragment data C3, the coded fragment data C4 and D3, for each of which the reproduction start time $T_s$ is after the transmission end time $T_e$ of the coded fragment data C3 and the period of time from the reproduction start time $T_s$ to the transmission end time $T_e$ is minimum, are chosen as candidates for the selected fragment data from the respective channels except the most important channel (step S11).

Of the selected fragment data candidates C4 and D3, only D3 has the minimum period of time d from the reproduction start time $T_s$ thereof to the transmission end time $T_e$ of the coded fragment data B2 as seen from FIGS. 19A and 19H. Therefore, the coded fragment data D3 is finally chosen as the temporary selected fragment data (steps S12 to S14).

On an assumption that the temporary selected fragment data D3 is transmitted, the estimated end time of transmission of the temporary selected fragment data D3 is not before the reproduction start time $t_{d3}$ thereof (step S15). Accordingly, of the selected fragment data candidates C4 and D3, the candidate C4, which is not yet finally chosen as the temporary selected fragment data, is checked and subjected to the same processing as described above (step S18).

Here, the coded fragment data C4 is finally chosen as the temporary selected fragment data. On an assumption that the temporary selected fragment data C4 is transmitted, the estimated end time of transmission of the temporary selected fragment data C4 is before the reproduction start time $t_{c4}$ thereof (step S15), but not before the reproduction start time $T_{a2}$ of the coded fragment data A2 of the most important channel to be next transmitted (step S16). Further, since there remains no more candidate for the coded fragment data which is not yet finally chosen as the temporary selected fragment data (step S18), the coded fragment data A2 of the most important channel to be next transmitted is decided as the selected fragment data (step S19) and then transmitted (step S1) as shown in FIG. 19I.

Thus, setting the buffering time makes it possible to increase the number of fragments which can be reproduced in real time.

The buffering time can be determined depending on, e.g., how long time can be allowed from the time when transmission of the coded fragment data for a piece of music requested from the client terminal 3 to the time when reproduction of the transmitted data is started in the client terminal 3. It is however desired that the actual buffering time is longer than the buffering time estimated by the server 1.

Figure 19:
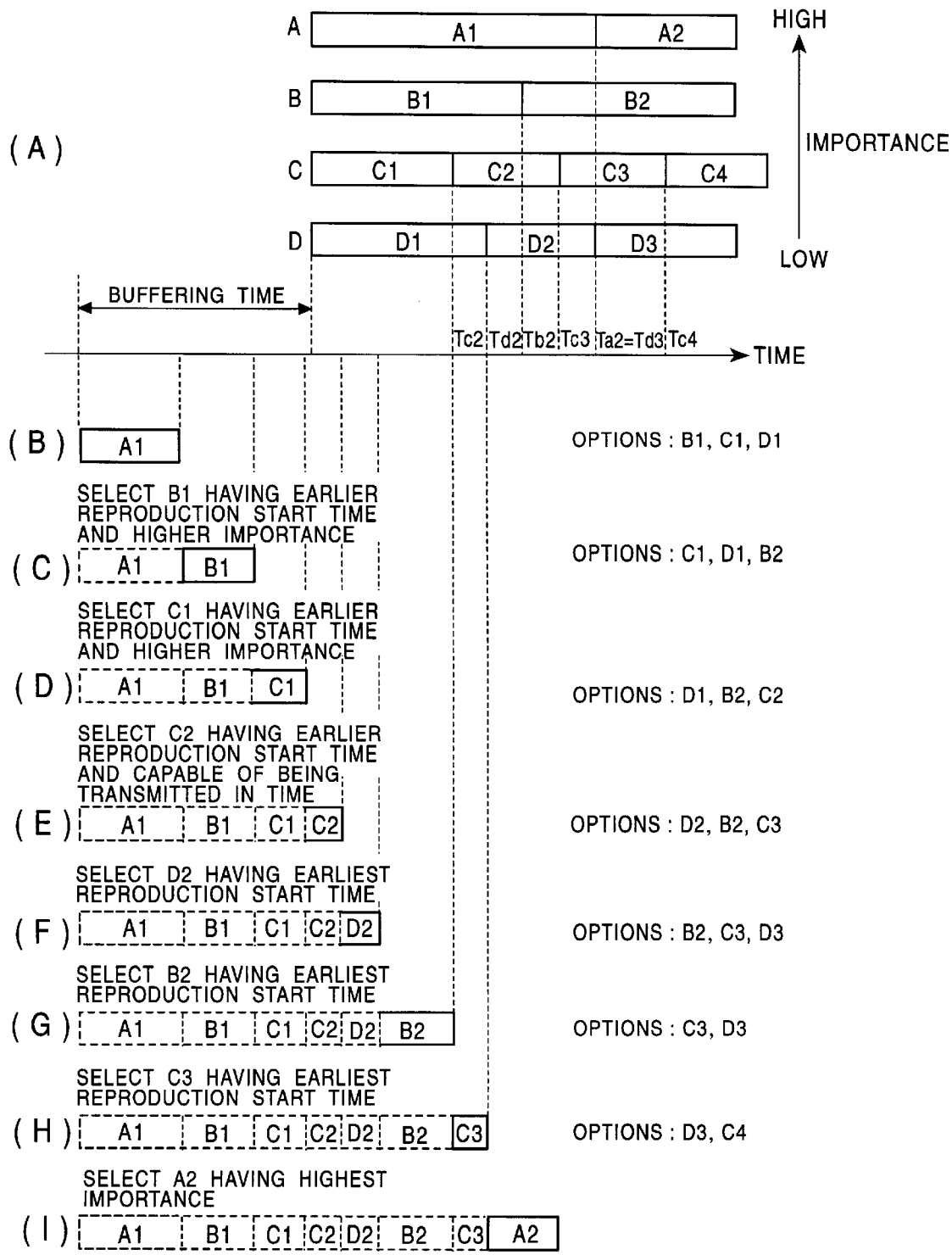
FIGS. 19A to 19I are charts for explaining the fragment selecting process executed in step S5 of FIG. 8 when the client terminal 3 has a buffer 61A.

While transmission of the coded fragment data D1 is abandoned in the embodiment of FIG. 19 as described above, the buffering time may be prolonged to such an extent that the coded fragment data D1 can also be transmitted and reproduced in real time.

Next, another embodiment of the transmitting process for audio signals executed by the server will be described with reference to a flowchart of FIG. 20.

As with the transmitting process described above, when a piece of music is requested to the server 1 from the client terminal 3, audio signals of respective channels making up the piece of music are each divided into fragments each having a predetermined length, and are encoded into coded fragment data. The coded fragment data is then added with the relevant reproduction start time and other necessary control information, followed by being supplied to the multiplexer 43.

Upon receiving the coded fragment data (added with headers) from the controller 42 for the first time after a request for the piece of music has been issued from the client terminal 3, the multiplexer 43 chooses, as selected fragment data, one of the coded fragment data that belongs to the channel set to the highest importance in the importance setting unit 34 and has the earliest reproduction start time, followed by supplying the selected fragment data to the transmitting circuit 33. Correspondingly, in step S61 of FIG. 20, the transmitting circuit 33 transmits the selected fragment data from the multiplexer 43, i.e., the coded fragment data that, in this case, belongs to the channel set to the highest importance in the importance setting unit 34 and has the earliest reproduction start time, to the client terminal 3 via the network 2.

The control flow then goes to step S62 to determine whether transmission of the selected fragment data is fully completed. If the transmission of the selected fragment data is completed, the control flow goes to step S63, following which similar processes as those in steps S3 to S5 of FIG. 8 are executed in steps S63 to S65, respectively.

On the contrary, if it is determined in step S62 that the transmission of the selected fragment data is not completed, namely, if the selected fragment data is under transmission, the control flow returns to step S66 to determine whether the current time (counted from, e.g., the head of music being as a reference) $T_n$ is before the reproduction start time $T_{sm}$ of the coded fragment data of the most important channel to be next transmitted. If it is determined in step S66 that the current time $T_n$ is before the reproduction start time $T_{sm}$ of the coded fragment data of the most important channel to be next transmitted, namely, when transmission of the coded fragment data of the most important channel to be next transmitted is in time for the start of reproduction thereof even if the coded fragment data under transmission continues to be transmitted, the control flow returns to step S61 to continue the transmission of the coded fragment data under transmission.

On the other hand, if it is determined in step S66 that the current time $T_n$ is not before the reproduction start time $T_{sm}$ of the coded fragment data of the most important channel to be next transmitted, namely, when transmission of the coded fragment data of the most important channel to be next transmitted would be too late for the start of reproduction thereof if the coded fragment data under transmission continues to be transmitted, the control flow goes to step S67 to cease the transmission of the coded fragment data under transmission. The control flow then goes to step S63 to detect the time when the transmission of the selected fragment data is ended (ceased) in step S67, i.e., the transmission end time $T_e$. Thereafter, the control flow goes to step S64 to execute similar processing as described above.

Figure 20:
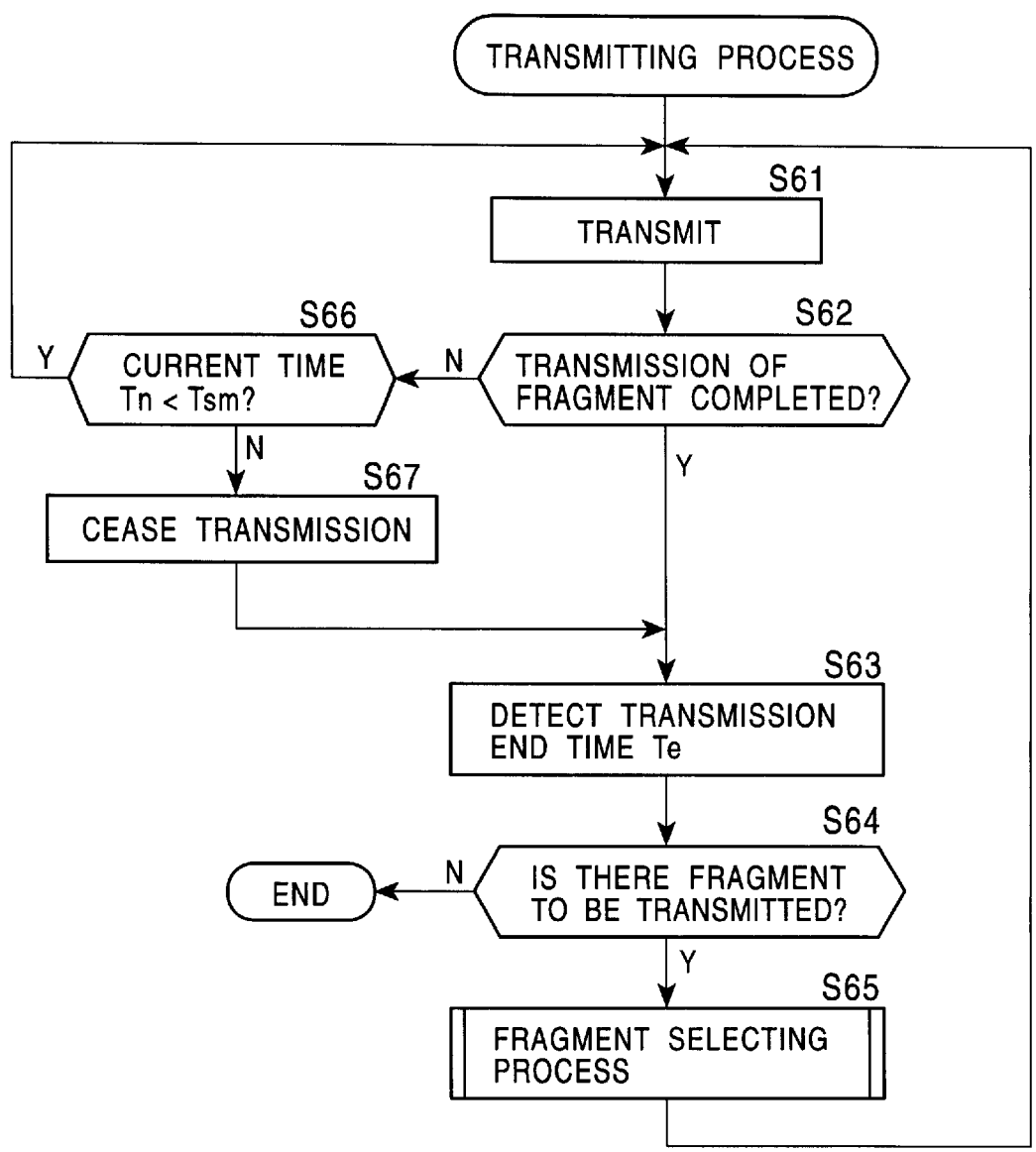
FIG. 20 is a flowchart for explaining a second embodiment of the transmitting process executed by the server 1.

Thus, with the transmitting process of FIG. 20, when the transmission of the coded fragment data of the most important channel to be next transmitted would be too late for the start of reproduction thereof, the transmission of the coded fragment data under transmission is ceased and the fragment selecting process is executed in step S65, that is to say, the selected fragment data is newly chosen. In the fragment selecting process of step S65, therefore, it is no longer required to derive the estimated end time of transmission of the temporary selected fragment data on an assumption that it is transmitted, and to determine whether the estimated end time of transmission of the temporary selected fragment data is before the reproduction start time thereof, and whether it is before the reproduction start time $T_{sm}$ of the coded fragment data of the most important channel to be next transmitted (e.g., steps S15 and S16 of FIG. 10).

Figure 21:
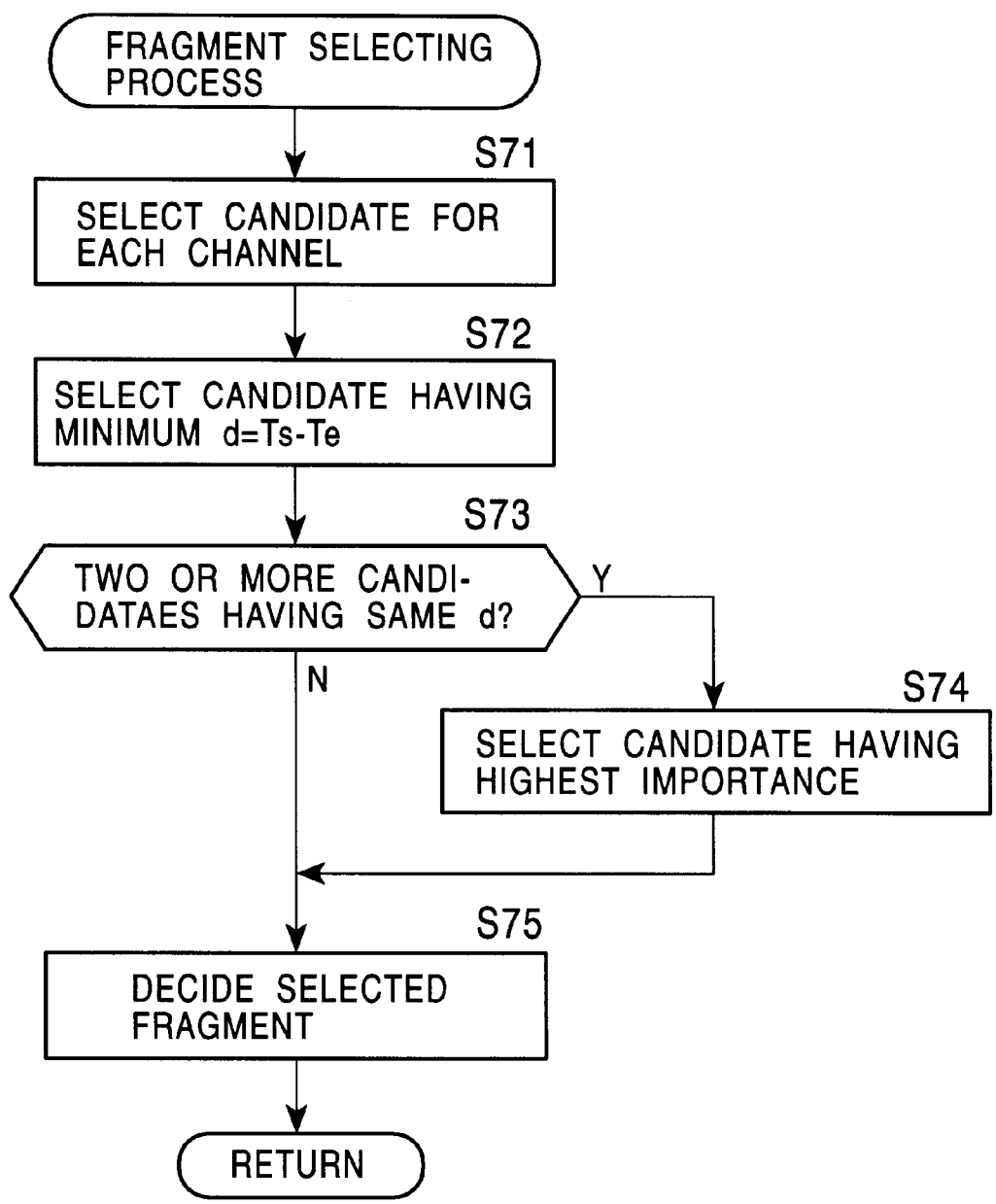
FIG. 21 is a flowchart for explaining a fragment selecting process executed in step S65 of FIG. 20.

More specifically, for example, the multiplexer 43 is constructed to preferentially choose, as the selected fragment data, (1) the coded fragment data having the earlier reproduction start time, and (2) the coded fragment data having higher importance if the reproduction start time is the same. In this case, the fragment selecting process in step S65 of FIG. 10 is executed in accordance with, for example, a flowchart shown in FIG. 21.

In the fragment selecting process of this case, a candidate for the selected fragment data is first chosen in step S71 from among the coded fragment data not yet transmitted for each of all the channels including the most important channel. Specifically, by way of example, the coded fragment data, for which the reproduction start time $T_s$ is after the transmission end time $T_e$ and the period of time from the reproduction start time $T_s$ to the transmission end time $T_e$ is minimum, is chosen as the selected fragment data candidate from the respective channels including the most important channel.

The control flow then goes to step S72 where, from among the selected fragment data candidates chosen from the respective channels including the most important channel, one for which the period of time d $(=T_s-T_e)$ from the reproduction start time $T_s$ to the transmission end time $T_e$ is minimum is chosen as temporary selected fragment data.

Subsequently, the control flow goes to step S73 to determine whether two or more of the selected fragment data candidates have the same period of time d. If it is determined in step S13 that two or more of the selected fragment data candidates have the same period of time d, namely, if the coded fragment data are chosen as the temporary selected fragment data from two or more channels in step S72, the control flow goes to step S74 where one of the coded fragment data chosen from the two or more channels, which belongs to the channel having the highest importance, is finally chosen as the temporary selected fragment data, followed by going to step S75.

If it is determined in step S73 that no selected fragment data candidates have the same period of time d, namely, if the coded fragment data is chosen as the temporary selected fragment data from one channel in step S72, that coded fragment data is finally chosen as the temporary selected fragment data, following which the control flow goes to step S75 while skipping step S74. In step S75, the coded fragment data chosen as the temporary selected fragment data at that time is decided as the temporary selected fragment data, followed by returning to the main control flow.

With the transmitting process of FIG. 20, the audio signals A to D of four channels shown in FIG. 9 are transmitted as shown in FIGS. 22A to 22F. It is here assumed that the buffering time is not taken into consideration and the fragment selecting process of step S65 is executed in accordance with the flowchart shown in FIG. 21.

Figure 22:
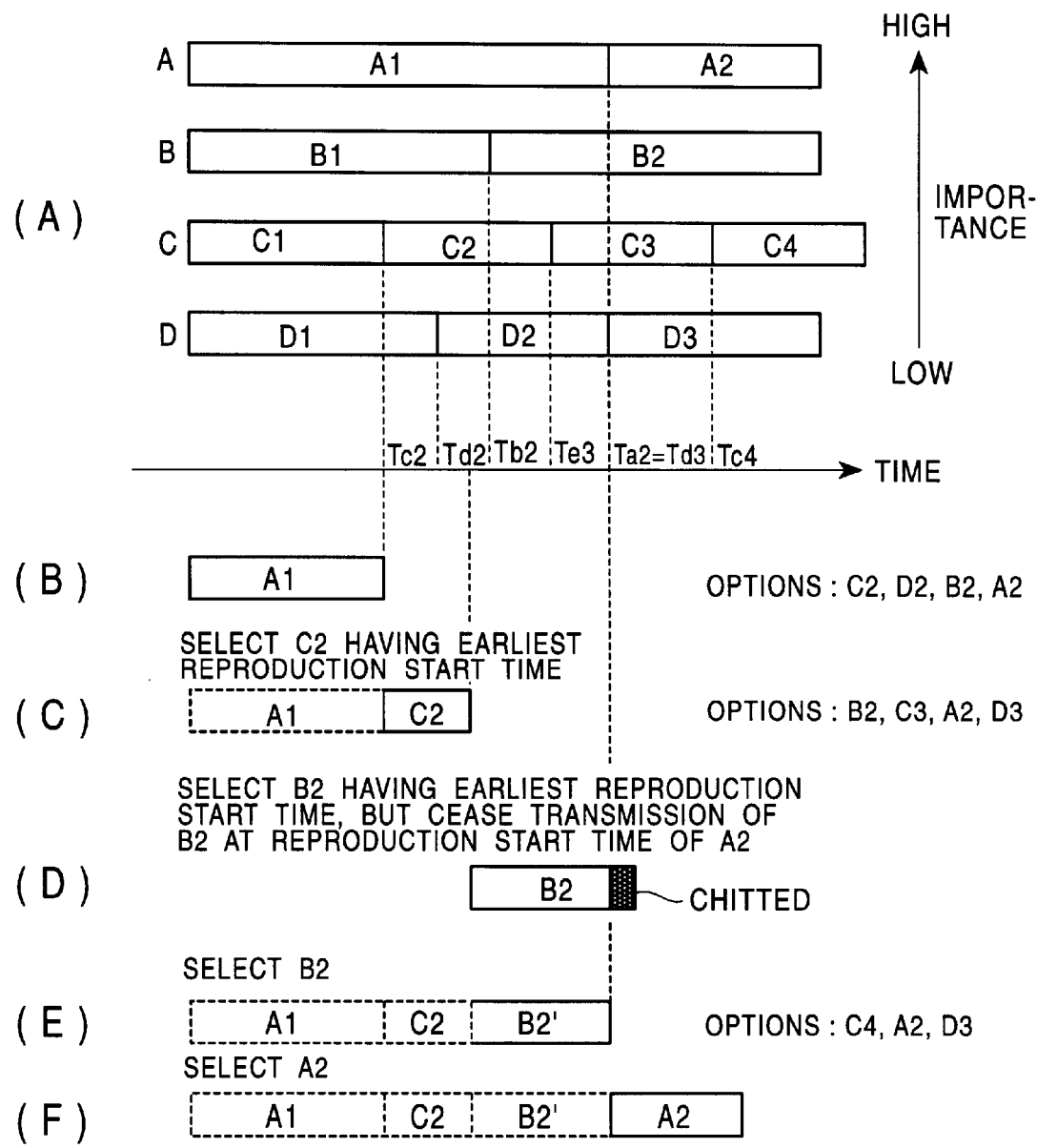
FIGS. 22A to 22F are charts for explaining the fragment selecting process in FIG. 21.

More specifically, the coded fragment data A1 of the most important channel, which has the earliest reproduction start time, is first chosen as the selected fragment data and then transmitted as shown in FIG. 22B (step S61).

After transmitting the coded fragment data A1, the coded fragment data A2, B2, C2 and D2, for each of which the reproduction start time $T_s$ is after the transmission end time $T_e$ of the coded fragment data A1 and the period of time from the reproduction start time $T_s$ to the transmission end time $T_e$ is minimum, are chosen as candidates for the selected fragment data from the respective channels including the most important channel (step S71).

Of the selected fragment data candidates A2, B2, C2 and D2, only C2 of which reproduction starts at the time $t_{c2}$ has the minimum period of time d $(=T_e-T_e)$ from the reproduction start time $T_s$ thereof to the transmission end time $T_e$ of the coded fragment data A1 as seen from FIGS. 22A and 22B. Therefore, the coded fragment data C2 is finally chosen as the temporary selected fragment data (steps S72 to S74).

Subsequently, the temporary selected fragment data C2 is decided as the selected fragment data (step S75) and then transmitted as shown in FIG. 22C.

Since the current time $T_n$ does not reach the reproduction start time $T_{a2}$ of the coded fragment data A2 of the most important channel to be next transmitted, as seen from FIGS. 22A and 22C, during the transmission of the selected fragment data C2, the selected fragment data C2 is normally transmitted to the last without being ceased during the transmission thereof.

After transmitting the coded fragment data C2, the coded fragment data A2, B2, C3 and D3, for each of which the reproduction start time $T_s$ is after the transmission end time $T_e$ of the coded fragment data C2 and the period of time from the reproduction start time $T_s$ to the transmission end time $T_e$ is minimum, are chosen as candidates for the selected fragment data from the respective channels including the most important channel (step S71).

Of the selected fragment data candidates A2, B2, C3 and D3, only B2 of which reproduction starts at the time $t_{c2}$ has the minimum period of time d $(=T_s-T_e)$ from the reproduction start time $T_s$ thereof to the transmission end time $T_e$ of the coded fragment data C2 as seen from FIGS. 22A and 22C. Therefore, the coded fragment data B2 is finally chosen as the temporary selected fragment data (steps S72 to S74).

Subsequently, the temporary selected fragment data B2 is decided as the selected fragment data (step S75) and then transmitted as shown in FIG. 22D.

Since the current time $T_n$ reaches the reproduction start time $T_{a2}$ of the coded fragment data A2 of the most important channel to be next transmitted, as seen from FIGS. 22A and 22D, during the transmission of the selected fragment data B2, the transmission of the selected fragment data B2 is ceased and ended at the reproduction start time $T_{a2}$ as shown in FIG. 22D (steps S66 and S67). As a result, the selected fragment data B2 is transmitted just midway as shown in FIG. 22E. In this case, the time at which the transmission of the selected fragment data B2 has been ceased is detected as the transmission end time $T_e$ thereof (step S63).

After ending (ceasing) the transmission of the coded fragment data B2, the coded fragment data A2, C4 and D3, for each of which the reproduction start time $T_s$ is after the transmission end time $T_e$ of the coded fragment data B2 and the period of time from the reproduction start time $T_s$ to the transmission end time $T_e$ is minimum, are chosen as candidates for the selected fragment data from the respective channels including the most important channel (step S71).

Of the selected fragment data candidates A2, C4 and D3, only A2 of which reproduction starts at the time $T_{a2}$ has the minimum period of time d ($=T_s-T_e$) from the reproduction start time $T_s$ thereof to the transmission end time $T_e$ of the coded fragment data B2 as seen from FIGS. 22A and 22C. Therefore, the coded fragment data A2 is finally chosen as the temporary selected fragment data (steps S72 to S74).

Subsequently, the temporary selected fragment data A2 is decided as the selected fragment data (step S75) and then transmitted as shown in FIG. 22F.

Thus, by ceasing the transmission of the selected fragment data when the transmission of the coded fragment data of the most important channel to be next transmitted would be too late for the start of reproduction thereof, it is no longer required to derive the estimated end time at which the transmission of the temporary selected fragment data under transmission is to be completed. The transmission of the coded fragment data of the most important channel to be next transmitted can be avoided from becoming too late for the start of reproduction thereof due to an error possibly caused by the need of estimation. In other words, the transmitting process is surely adaptable for the transmission rate of the network 2 that varies with time.

Figure 23:
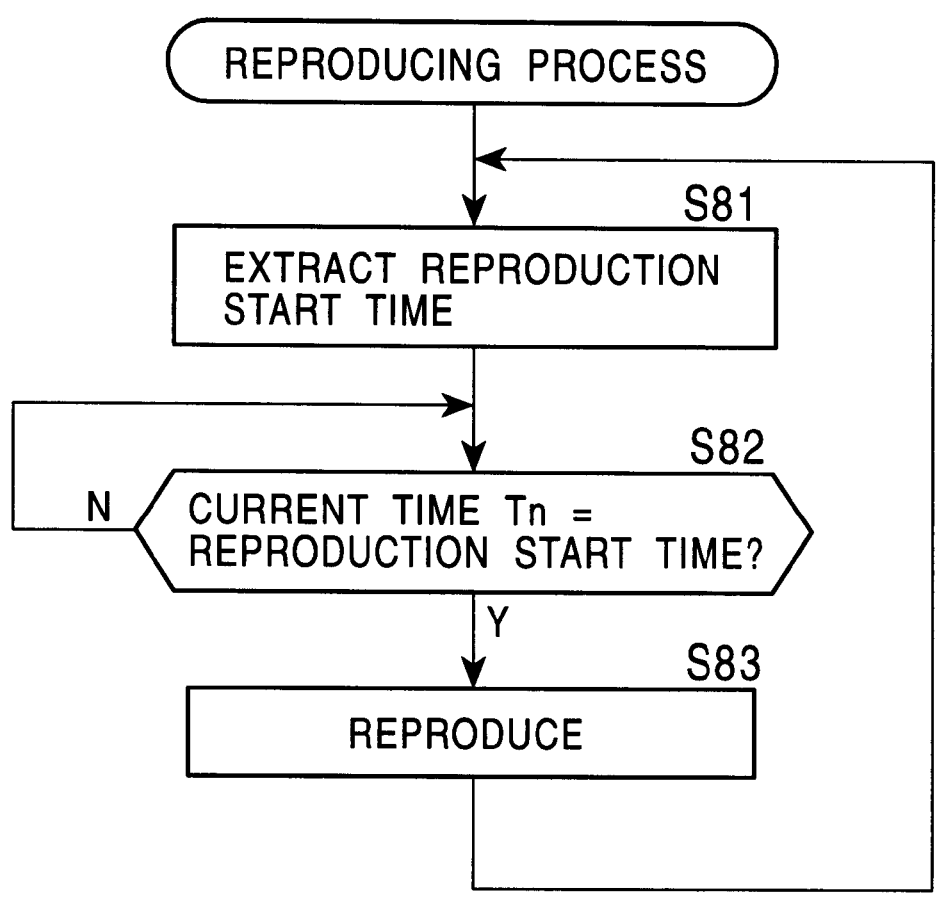
FIG. 23 is a flowchart for explaining a reproducing process executed by the client terminal 3.

Next, a reproducing process of (coded) audio signals executed by the client terminal 3 will be described with reference to a flowchart of FIG. 23.

When a piece of music is requested to the server 1 from the client terminal 3 and coded data is transmitted from the server 1 as described above, the coded data is received by the receiving circuit 61 of the client terminal 3 (FIG. 6). The received coded data is subjected to format conversion in the receiving circuit 61 and then supplied to the separator 71 of the decoding circuit 62.

In the separator 71, as shown in step S81, the coded fragment data and the headers are extracted from the coded data, the extracted coded fragment data are supplied to corresponding channels of the decoders $72_1$ to $72_M$, respectively, and the reproduction start time put in each header is supplied to the reproduction timing adjuster 73.

The coded fragment data from the separator 71 is decoded to the original fragment in the decoder $72_m$ and then supplied to the reproduction timing adjuster 73. In step S82, the reproduction timing adjuster 73 determines whether the current time $T_n$ is coincident with the reproduction start time supplied from the separator 71. If it is determined in step S82 that the current time $T_n$ is not coincident with the reproduction start time, the control flow returns to step S82. On the other hand, if it is determined that the current time $T_n$ is coincident with the reproduction start time supplied from the separator 71, the reproduction timing adjuster 73 outputs the audio signal fragment, which has been added with the relevant reproduction start time and resulted from decoding the coded fragment data, to the audio signal output circuit 63. The audio signal output circuit 63 applies a predetermined process to the audio signal fragment from the reproduction timing adjuster 73, followed by outputting it. The audio signal fragment is then reproduced in step S83. Thereafter, the control flow returns to step S81 to repeat similar processing as described above.

In the case of the receiving circuit 61 having the buffer 61A, the coded data received by the receiving circuit 61 is supplied to the separator 71 after being temporarily stored in the buffer 61A.

As described above, digital signals of multiple channels are each divided into one or more fragments, and the fragments of multiple channels are each encoded into coded fragment data. At the transmission end time of the coded fragment data previously transmitted, one of the coded fragment data of multiple channels is selected, and the selected coded fragment data is transmitted. It is therefore possible to realize scalability in units of channel (part in the illustrated embodiments) in such a manner, for example, that the coded fragment data of more channels are transmitted when the transmission rate is sufficiently large, and the coded fragment data of less channels are transmitted when the transmission rate is not sufficiently large. As a result, when the transmission rate is sufficiently large, a piece of music can be provided with high sound quality. Also, even when the transmission rate is insufficient, a piece of music can be provided in real time although sound quality deteriorates somewhat.

Further, in the illustrated embodiments, since the server 1 transmits audio signals while assigning a channel for each part, the user at the client terminal 3 can adjust a volume level of the sound of certain one musical instrument or the singing voice alone, listen to only a vocal part or an accompaniment part, or listen to the sounds of several desired musical instruments in a mixed state. This makes it possible to provide service with high user interactivity.

While the illustrated embodiments execute processing on audio signals, the present invention is also applicable to the case of providing other digital signals such as video signals or text data, for example. In addition to the case of providing only one kind of digital signals such as audio signals or video signals, the present invention is further applicable to the case of providing different kinds of signals in a combination of video signals and audio signals in synch therewith. In this case, for example, real-time reproduction of at least video signals-can be ensured by setting the importance of channels of the video signals to be higher than the importance of channels of the audio signals.

Moreover, the network 2 may be a wire or wireless system so long as it is a bidirectional network.

The server 1 shown in FIG. 4 and the client terminal 3 shown in FIG. 6 can be realized by rendering a CPU (computer) to execute a computer program (software), or by dedicated hardware.

When the processing executed by the server 1 and the client terminal 3 is realized with a computer program, the computer program may be provided in the form of a recording medium such as a CD-ROM (Compact Disc—Read Only Memory) on which it is recorded, or may be provided by transmission via Internet or any other suitable transmitting medium.

While the coded data outputted from the server 1 is provided in the illustrated embodiments via the network 2 as a transmitting medium, the coded data may be provided to the client terminal 3 in the form of a recording medium such as a CD-ROM on which the coded data is recorded.

Furthermore, the manner of selecting a particular fragment in the fragment selecting process is not limited to those described above.

According to the transmitting apparatus and method and the providing medium as described in the above embodiments, digital signals of multiple channels are each divided into one or more fragments, and the fragments of multiple channels are each encoded into coded fragment data. At the predetermined time, one of the coded fragment data of multiple channels is selected, and the selected coded fragment data is transmitted. The digital signals can be therefore transmitted in such a manner as to be able to decode and reproduce them in real time, for example.

Also, according to the providing medium as described in the above embodiments, coded fragment data is provided which is obtained by dividing each of digital signals of multiple channels into one or more fragments, encoding each of the fragments of multiple channels into coded fragment data, and at the predetermined time, selecting and then outputting one of the coded fragment data of multiple channels. The digital signals can be therefore decoded and reproduced in real time, for example.

Further, according to the receiving apparatus and method and the providing medium as described in the above embodiments, coded data is separated into coded fragment data that is obtained by dividing each of digital signals of multiple channels into one or more fragments and encoding each of the fragments of multiple channels, and time information related to the reproduction start time at which reproduction of the coded fragment data is to be started. Then, the coded fragment data is decoded into the original fragment and reproduction of the original fragment is controlled in accordance with the time information. The digital signals can be therefore decoded and reproduced in real time, for example.

Moreover, according to the receiving apparatus and method and the-providing medium as described in the above embodiments, coded fragment data is received which is obtained by dividing each of digital signals of multiple channels into one or more fragments, encoding each of the fragments of multiple channels into coded fragment data, and at the predetermined time, selecting and then outputting one of the coded fragment data of multiple channels. The coded fragment data is then decoded into the original fragment. The digital signals can be therefore decoded and reproduced in real time, for example.

What is claimed is:

1. A transmitting apparatus for transmitting coded data resulted from encoding digital audio signals of multiple channels comprising:
   receiving means for receiving multiple parts of a main audio signal in a synchronous relation, wherein each part comprises a digital audio signal,
   allocating means for allocating a predetermined channel to the digital audio signal of each part,
   dividing means for dividing each digital audio signal into one or more fragments,
   coding means for encoding respectively said fragments into coded fragment data,
   selecting means for selecting one of said coded fragment data at a predetermined time, wherein each channel is assioned an importance index set to represent the respective level of importance of each channel, and
   transmitting means for transmitting the coded fragment data.

2. A transmitting apparatus according to claim 1, wherein said apparatus further comprises comparing means for
   comparing the current time and the reproduction start time when reproduction of the digital audio signal of the channel having the highest importance is to be started, and
   said transmitting means forcibly ceases the transmission of the coded fragment data that is under transmission, in accordance with a comparison result of said comparing means.

3. A transmitting apparatus according to claim 1, further comprising adding means for adding, to said coded fragment data, time information related to the reproduction start time when reproduction of said coded fragment data is to be started.

4. A transmitting apparatus according to claim 1, wherein said selecting means selects one of said coded fragment data based on the reproduction start time when reproduction of each of said coded fragment data is to be started.

5. A transmitting apparatus according to claim 4, wherein said selecting means selects said coded fragment data which is to be transmitted by said transmitting means until the reproduction start time of the coded fragment data when reproduction of said coded fragment data is to be started.

6. A transmitting apparatus according to claim 4, wherein said selecting means selects one of the coded fragment data to be reproduced after a transmission end time when the transmission of the coded fragment data by said transmitting means has been completed, which has the earliest reproduction start time.

7. A transmitting apparatus according to claim 1, wherein said selecting means selects one of said coded fragment data based on the data amount of each of said coded fragment data.

8. A transmitting apparatus according to claim 1, wherein said dividing means divides each digital audio signal into fragments having a fixed or variable length.

9. A transmitting apparatus according to claim 1, wherein said dividing means divides each digital audio signal into fragments having the same length for all the multiple channels.

10. A transmitting apparatus according to claim 1, wherein said dividing means divides each digital audio signal into fragments such that the fragments of the digital audio signal of one channel have a different length from the fragments of the digital audio signal of another channel.

11. A transmitting apparatus according to claim 1, wherein said digital audio signal of one channel differs in type from the digital audio signal of another channel.

12. A transmitting method for transmitting coded data resulted from encoding digital audio signals of multiple channels comprising:
    receiving multiple parts of a main audio signal in a synchronous relation, wherein each part comprises a digital audio signal;
    allocating a predetermined channel to the digital audio signal of each part,
    dividing each digital audio signal into one or more fragments,
    encoding respectively said fragments into coded fragment data,
    selecting one of said coded fragment data at a predetermined time, wherein each channel is assioned an importance index set to represent the respective level of importance of each channel, and
    transmitting the selected coded fragment data.

13. A transmitting method according to claim 12, further comprising:
    comparing the current time and the reproduction start time when reproduction of the digital audio signal of the channel having the highest importance is to be started, and ceasing the transmission of the coded fragment data that is under transmission, in accordance with a comparison result.

14. A transmitting method according to claim 12, further comprising adding, to said coded fragment data, time information related to the reproduction start time when reproduction of said coded fragment data is to be started.

15. A transmitting method according to claim 12, wherein said selecting selects one of said coded fragment data based on the reproduction start time when reproduction of each of said coded fragment data is to be started.

16. A transmitting method according to claim 15, wherein said selecting selects said coded fragment data which is to be transmitted by said transmitting means until the reproduction start time of the coded fragment data when reproduction of said coded fragment data is to be started.

17. A transmitting method according to claim 15, wherein said selecting selects one of the coded fragment data to be reproduced after the transmission end time when the transmission of the coded fragment data by said transmitting step has been completed, which has the earliest reproduction start time.

18. A transmitting method according to claim 12, wherein said selecting selects one of said coded fragment data based on the data amount of each of said coded fragment data.

19. A transmitting method according to claim 12, wherein said dividing divides each of said digital audio signals into fragments having a fixed or variable length.

20. A transmitting method according to claim 12, wherein said dividing step divides each of said digital audio signals into fragments having the same length for all the multiple channels.

21. A transmitting method according to claim 12, wherein said dividing step divides each of said digital audio signals into fragments such that the fragments of the digital audio signal of one channel have a different length from the fragments of the digital audio signal of another channel.

22. A transmitting method according to claim 12, wherein said digital audio signal of one channel differs in type from the digital audio signal of another channel.

23. A providing medium for providing a computer program for rendering a computer to execute a process of transmitting coded data resulted from encoding digital audio signals of multiple channels said computer program comprising:
    receiving code for receiving multiple parts of a main audio signal in a synchronous relation, wherein each part comprises a digital audio signal,
    allocating code for allocating a predetermined channel to the digital audio signal of each part,
    dividing code for dividing each of digital audio signal into one or more fragments,
    coding code for encoding respectively said fragments into coded fragment data,
    selecting code for selecting one of said coded fragment data at a predetermined time, wherein each channel is assigned an importance set to represent the level of importance of each channel, and
    transmitting code for transmitting the coded fragment data.

24. A providing medium according to claim 23, wherein said computer program further comprises comparing code for of comparing the current time and the reproduction start time when reproduction of the digital audio signal of the channel having the highest importance is to be started, and said transmitting code forcibly ceases the transmission of the coded fragment data that is under transmission, in accordance with a comparison result of said comparing code.

25. A providing medium according to claim 23, wherein said computer program further comprises adding code for adding, to said coded fragment data, time information related to the reproduction start time when reproduction of said coded fragment data is to be started.

26. A providing medium according to claim 23, wherein said selecting code selects one of said coded fragment data based on the reproduction start time when reproduction of each of said coded fragment data is to be started.

27. A providing medium according to claim 26, wherein said selecting code selects said coded fragment data which is to be transmitted by said transmitting means until the reproduction start time of the coded fragment data when reproduction of said coded fragment data is to be started.

28. A providing medium according to claim 26, wherein said selecting code selects one of the coded fragment data to be reproduced after the transmission end time when the transmission of the coded fragment data by said transmitting step has been completed, which has the earliest reproduction start time.

29. A providing medium according to claim 23, wherein said selecting code selects one of said coded fragment data based on the data amount of each of said coded fragment data.

30. A providing medium according to claim 23, wherein said dividing code divides each of said digital audio signals into fragments having a fixed or variable length.

31. A providing medium according to claim 23, wherein said dividing code divides each of said digital audio signals into fragments having the same length for all the multiple channels.

32. A providing medium according to claim 23, wherein said dividing code divides each of said digital audio signals into fragments such that the fragments of the digital audio signal of one channel have a different length from the fragments of the digital audio signal of another channel.

33. A providing medium according to claim 23, wherein said digital audio signal of one channel differs in type from the digital audio signal of another channel.

34. A receiving apparatus for receiving coded data resulted from encoding digital audio signals of multiple channels comprising:
    receiving means for receiving coded fragment data that is obtained by:
        receiving multiple parts of a main audio signal in a synchronous relation, wherein each part comprises a digital audio signal,
        allocating a predetermined channel to the digital audio signal of each part,
        dividing each digital audio signal into one or more fragments,
        encoding respectively said fragments into coded fragment data, and
        selecting and transmitting one of said coded fragment data at a predetermined time, wherein said each channel is assigned an importance index set to represent the respective level of importance of each channel; and
    decoding means for decoding coded fragment data received by said receiving means into a fragment.

35. A receiving method for receiving coded data resulted from encoding digital audio signals of multiple channels, said method comprising:
    receiving coded fragment data that is obtained by:
        receiving multiple parts of a main audio signal in a synchronous relation, wherein each part comprises a digital audio signal, allocating a predetermined channel to the digital audio signal of each part, dividing each digital audio signal into one or more fragments, encoding respectively said fragments into coded fragment data, and selecting and transmitting one of said coded fragment data at a predetermined time, wherein said each channel is assioned an importance index set to represent the respective level of importance of each channel; and a decoding step of decoding the coded fragment data received in said receiving step into a fragment.

36. A providing medium for providing a computer program for rendering a computer to execute a process of receiving coded data resulted from encoding digital audio signals of multiple channels, said computer program including:

receiving code for receiving coded fragment data that is obtained by:

receiving multiple parts of a main audio signal in a synchronous relation, wherein each part comprises a digital audio signal, allocating a predetermined channel to the digital audio signal of each part, dividing each digital audio signal into one or more fragments, encoding respectively said fragments into coded fragment data, and selecting and transmitting one of said coded fragment data at a predetermined time, wherein said each channel is assioned an importance index set to represent the respective level of importance of each channel; and decoding code for decoding the coded fragment data received by said receiving means into the fragment.

37. A transmitting apparatus for transmitting coded data resulted from encoding digital audio signals of multiple channels comprising:

receiving means for receiving multiple parts of a main audio signal in a synchronous relation, wherein each part comprises a digital audio signal, allocating means for allocating a predetermined channel to the digital audio signal of each part, dividing means for dividing each digital audio signal into one or more fragments, coding means for encoding respectively said fragments into coded fragment data, selecting means for selecting one of said coded fragment data at a predetermined time, transmitting means for transmitting the coded fragment data selected by said selecting means, detecting means for detecting the transmission end time when said transmission of the coded fragment data transmitted by said transmitting means is ended, wherein at the transmission end time said selecting means selects the coded fragment data to be next transmitted by said transmitting means, and wherein said multiple channels are assigned with importance indexes set to represent respective levels of importance of said multiple channels, and comparing means for comparing the current time and the reproduction start time when reproduction of the digital audio signal of the channel having the highest importance is to be started, wherein said transmitting means forcibly ceases the transmission of the coded fragment data that is under transmission, in accordance with a comparison result of said comparing means.

38. A transmitting apparatus for transmitting coded data resulted from encoding digital audio signals of multiple channels comprising:

receiving means for receiving multiple parts of a main audio signal in a synchronous relation, wherein each part comprises a digital audio signal, allocating means for allocating a predetermined channel to the digital audio signal of each part, dividing means for dividing each digital audio signal into one or more fragments, coding means for encoding respectively said fragments into coded fragment data, selecting means for selecting one of said coded fragment data at a predetermined time, transmitting means for transmitting the coded fragment data selected by said selecting means, and detecting means for detecting the transmission end time when said transmission of the coded fragment data transmitted by said transmitting means is ended, wherein at the transmission end time said selecting means selects the coded fragment data to be next transmitted by said transmitting means, and wherein said selecting means selects one of said coded fragment data based on the reproduction start time when reproduction of each of said coded fragment data is to be started.

39. A transmitting apparatus according to claim 38, wherein said selecting means selects said coded fragment data which is to be transmitted by said transmitting means until the reproduction start time of the coded fragment data when reproduction of said coded fragment data is to be started.

40. A transmitting apparatus according to claim 38, wherein said selecting means selects one of the coded fragment data to be reproduced after the transmission end time when the transmission of the coded fragment data by said transmitting means has been completed, which has the earliest reproduction start time.

41. A transmitting apparatus for transmitting coded data resulted from encoding digital audio signals of multiple channels comprising:

receiving means for receiving multiple parts of a main audio signal in a synchronous relation, wherein each part comprises a digital audio signal, allocating means for allocating a predetermined channel to the digital audio signal of each part, dividing means for dividing each digital audio signal into one or more fragments, coding means for encoding respectively said fragments into coded fragment data, selecting means for selecting one of said coded fragment data at a predetermined time, transmitting means for transmitting the coded fragment data; and detecting means for detecting the transmission end time when said transmission of the coded fragment data transmitted by said transmitting means is ended, wherein at the transmission end time said selecting means selects the coded fragment data to be next transmitted by said transmitting means, and wherein said selecting means selects one of said coded fragment data based on the data amount of each of said coded fragment data.

42. A transmitting method for transmitting coded data resulted from encoding digital audio signals of multiple channels comprising:
   receiving multiple parts of a main audio signal in a synchronous relation, wherein each part comprises a digital audio signal,
   allocating a predetermined channel to the digital audio signal of each part,
   dividing each digital audio signal into one or more fragments,
   encoding respectively said fragments into coded fragment data,
   selecting one of said coded fragment data at a predetermined time,
   transmitting the coded fragment data,
   detecting the transmission end time when said transmission of the coded fragment data transmitted in said transmitting step is ended, wherein at the transmission end time said selecting step selects the coded fragment data to be next transmitted in said transmitting step, and wherein said multiple channels are assigned with importance indexes set to represent respective levels of importance of said multiple channels, and
   comparing the current time and the reproduction start time when reproduction of the digital audio signal of the channel having the highest importance is to be started, wherein said transmitting step forcibly ceases the transmission of the coded fragment data that is under transmission, in accordance with a comparison result of said comparing step.

43. A transmitting method for transmitting coded data resulted from encoding digital audio signals of multiple channels comprising:
   receiving multiple parts of a main audio signal in a synchronous relation, wherein each part comprises a digital audio signal,
   allocating a predetermined channel to the digital audio signal of each part,
   dividing each digital audio signal into one or more fragments,
   encoding respectively said fragments into coded fragment data,
   selecting one of said coded fragment data at a predetermined time,
   transmitting the coded fragment data; and
   detecting the transmission end time when said transmission of the coded fragment data transmitted in said transmitting step is ended, wherein at the transmission end time said selecting step selects the coded fragment data to be next transmitted in said transmitting step, and wherein said selecting step selects one of said coded fragment data based on the reproduction start time when reproduction of each of said coded fragment data is to be started.

44. A transmitting method according to claim 43, wherein said selecting selects said coded fragment data which is to be transmitted by said transmitting means until the reproduction start time of the coded fragment data when reproduction of said coded fragment data is to be started.

45. A transmitting method according to claim 43, wherein said selecting selects one of the coded fragment data to be reproduced after the transmission end time when the transmission of the coded fragment data by said transmitting step has been completed, which has the earliest reproduction start time.

46. A transmitting method for transmitting coded data resulted from encoding digital audio signals of multiple channels comprising:
   receiving multiple parts of a main audio signal in a synchronous relation, wherein each part comprises a digital audio signal,
   allocating a predetermined channel to the digital audio signal of each part,
   dividing each digital audio signal into one or more fragments,
   encoding respectively said fragments into coded fragment data,
   selecting one of said coded fragment data at the predetermined time,
   transmitting the coded fragment data, and
   detecting the transmission end time when said transmission of the coded fragment data transmitted in said transmitting step is ended, wherein at the transmission end time said selecting step selects the coded fragment data to be next transmitted in said transmitting step, and wherein said selecting step selects one of said coded fragment data based on the data amount of each of said coded fragment data.

47. A providing medium for providing a computer program for rendering a computer to execute a process of transmitting coded data resulted from encoding digital audio signals of multiple channels, said computer program comprising:
   receiving code for receiving multiple parts of a main audio signal in a synchronous relation, wherein each part comprises a digital audio signal,
   allocating code for allocating a predetermined channel to the digital audio signal of each part,
   dividing code for dividing each of digital audio signal into one or more fragments,
   coding code for encoding respectively said fragments into coded fragment data,
   selecting code for selecting one of said coded fragment data at a predetermined time,
   transmitting code for transmitting the coded fragment data,
   detecting code for detecting the transmission end time when said transmission of the coded fragment data transmitted by said transmitting code is ended, wherein at the transmission end time said selecting code selects the coded fragment data to be next transmitted by said transmitting code, and wherein said multiple channels are assigned with importance indexes set to represent respective levels of importance of said multiple channels, and comparing code for comparing the current time and the reproduction start time when reproduction of the digital audio signal of the channel having the highest importance is to be started, wherein said transmitting step forcibly ceases the transmission of the coded fragment data that is under transmission, in accordance with a comparison result of said comparing code.

48. A providing medium for providing a computer program for rendering a computer to execute a process of transmitting coded data resulted from encoding digital audio signals of multiple channels for each channel, said computer program comprising:
   receiving code for receiving multiple parts of a main audio signal in a synchronous relation, wherein each part comprises a digital audio signal, allocating code for allocating a predetermined channel to the digital audio signal of each part, dividing code for dividing each of digital audio signal into one or more fragments, coding code for encoding respectively said fragments into coded fragment data, selecting code for selecting one of said coded fragment data at a predetermined time, transmitting code for transmitting the coded fragment data, detecting code for detecting the transmission end time when said transmitting of the coded fragment data transmitted by said transmitting code is ended, wherein at the transmission end time said selecting code selects the coded fragment data to be next transmitted by said transmitting code, and wherein said selecting code selects one of said coded fragment data based on the reproduction start time when reproduction of each of said coded fragment data is to be started.

49. A providing medium according to claim 48, wherein said selecting code selects said coded fragment data which is to be transmitted normally by said transmitting code until the reproduction start time of the coded fragment data when reproduction of said coded fragment data is to be started.

50. A providing medium according to claim 48, wherein said selecting code selects one of the coded fragment data to be reproduced after the transmission end time when the transmission of the coded fragment data by said transmitting code has been completed, which has the earliest reproduction start time.

51. A providing medium for providing a computer program for rendering a computer to execute a process of transmitting coded data resulted from encoding digital audio signals of multiple channels, said computer program comprising:

receiving code for receiving multiple parts of a main audio signal in a synchronous relation, wherein each part comprises a digital audio signal, allocating code for allocating a predetermined channel to the digital audio signal of each part, dividing code for dividing each of digital audio signal into one or more fragments, coding code for encoding respectively said fragments into coded fragment data, selecting code for selecting one of said coded fragment data of multiple channels at a predetermined time, transmitting code for transmitting the coded fragment data, and detecting code for detecting the transmission end time when said transmission of the coded fragment data transmitted by said transmitting code is ended, wherein at the transmission end time said selecting code selects the coded fragment data to be next transmitted by said transmitting code, and wherein said selecting code selects one of said coded fragment data based on the data amount of each of said coded fragment data.

* * * * *